United States Patent
Madajczak

(10) Patent No.: US 12,455,830 B2
(45) Date of Patent: Oct. 28, 2025

(54) EFFICIENT CACHE DATA STORAGE FOR ITERATIVE WORKLOADS

(71) Applicant: Advanced Micro Devices, Inc., 2485 Augustine Drive, CA (US)

(72) Inventor: Tomasz Bogdan Madajczak, Gdansk (PL)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/478,735

(22) Filed: Sep. 29, 2023

(65) Prior Publication Data

US 2025/0110889 A1 Apr. 3, 2025

(51) Int. Cl.
*G06F 12/10* (2016.01)

(52) U.S. Cl.
CPC ...... *G06F 12/10* (2013.01); *G06F 2212/1024* (2013.01)

(58) Field of Classification Search
CPC .......... G06F 12/10; G06F 2212/1024
See application file for complete search history.

(56) References Cited

U.S. PATENT DOCUMENTS

| 10,311,025 | B2* | 6/2019 | Yang .................. G06F 16/188 |
| 2003/0079087 | A1 | 4/2003 | Kuwata |
| 2013/0151779 | A1 | 6/2013 | Daly et al. |
| 2017/0147496 | A1 | 5/2017 | Sasanka |
| 2017/0220477 | A1 | 8/2017 | Wang et al. |
| 2018/0314646 | A1 | 11/2018 | Xu et al. |
| 2018/0314647 | A1 | 11/2018 | Bedi et al. |
| 2019/0079877 | A1 | 3/2019 | Gaur et al. |
| 2019/0250830 | A1* | 8/2019 | Bannon ............... G06F 13/1689 |

(Continued)

FOREIGN PATENT DOCUMENTS

JP 2003022211 A 1/2003

OTHER PUBLICATIONS

Lai, Bo-Cheng Charles, Hsien-Kai Kuo, and Jing-Yang Jou. "A cache hierarchy aware thread mapping methodology for GPGPUs." IEEE Transactions on Computers 64.4 (2014): 884-898. (Year: 2014).*

(Continued)

*Primary Examiner* — Nicholas J Simonetti
(74) *Attorney, Agent, or Firm* — Kowert, Hood, Munyon, Rankin & Goetzel, P.C.; Rory D. Rankin

(57) ABSTRACT

An apparatus and method for efficiently managing memory requests. An integrated circuit includes multiple compute circuits, each capable of processing a data block of multiple data blocks. An amount of available data storage space of a cache is smaller than storage space in a memory for storing the multiple data blocks. In various implementations, the multiple compute circuits process data blocks in a contiguous manner, and pointer updating circuitry assigns data block identifiers in a contiguous manner. The circuitry updates the pointer of an initial data block to use for a particular stage of data processing to a value which increases cache hits during the particular stage of data processing. The circuitry accounts for the number of data blocks of intermediate results to increase or decrease for a particular stage of data processing when updating the pointers.

20 Claims, 15 Drawing Sheets

(56) References Cited

U.S. PATENT DOCUMENTS

2020/0151102 A1\* 5/2020 Mah .................... G06F 12/0864
2021/0157730 A1 5/2021 Hornung et al.

OTHER PUBLICATIONS

Kolokasis, Iacovos G., et al. "Say Goodbye to Off-heap Caches! On-heap Caches Using {Memory-Mapped}{I/O}." 12th USENIX Workshop on Hot Topics in Storage and File Systems (HotStorage 20). 2020. (Year: 2020).\*
International Search Report and Written Opinion in International Application No. PCT/US2020/064884, mailed Apr. 1, 2021, 9 pages.
Wang et al., "Less is More: Leveraging Belady's Algorithm with Demand-based Learning", 2017, 4 pages, https://pdfs.semanticscholar.org/de53/6c7cbe9ce8edddb1482f1d1ac2d8478792e3.pdf. [Retrieved Oct. 24, 2019].

\* cited by examiner

*Processing Data Storage Arrangement 200*

| XY | 0 | 1 | 2 | 3 | 4 | 5 | 6 | 7 | 8 | 9 | 10 | 11 |
|---|---|---|---|---|---|---|---|---|---|---|---|---|
| 0 | 0 | 1 | 2 | 3 | 4 | 5 | 6 | 7 | 8 | 9 | 10 | 11 |
| 1 | 12 | 13 | 14 | 15 | 16 | 17 | 18 | 19 | 20 | 21 | 22 | 23 |
| 2 | 24 | 25 | 26 | 27 | 28 | 29 | 30 | 32 | 32 | 33 | 34 | 35 |
| 3 | 36 | 37 | 38 | 39 | 40 | 41 | 42 | 43 | 44 | 45 | 46 | 47 |
| 4 | 48 | 49 | 50 | 51 | 52 | 53 | 54 | 55 | 56 | 57 | 58 | 59 |
| 5 | 60 | 61 | 62 | 63 | 64 | 65 | 66 | 67 | 68 | 69 | 70 | 71 |
| 6 | 72 | 73 | 74 | 75 | 76 | 77 | 78 | 79 | 80 | 81 | 82 | 83 |
| 7 | 84 | 85 | 86 | 87 | 88 | 89 | 90 | 91 | 92 | 93 | 94 | 95 |

Thread Group Identifier 230 (Data Block Identifier 230)

Initial Stage of Data Processing of Data Blocks
Each Initial Cache Access Results in a Miss
(Cache Misses on Rows 0-7)

Initial Row of Data to be Processed 212
Data Block of Initial Row to be Processed 210
Initial Row of Data to be Processed and Maintained in the Cache 222
Data Block of Initial Row to be Processed and Maintained in the Cache 220

Data Block Type 240 (Generated, Stored, and Evicted from Cache)
Data Block Type 250 (Generated, Stored, and Maintained in Cache)

*FIG. 2*

Between First Stage and Second Stage of Data Processing of Data Blocks
Cache Access Hits for Rows 6-7 During Second Stage
Cache Access Misses for Rows 0-5 During Second Stage

*Processing Data Storage Space 300*

| XY | 0 | 1 | 2 | 3 | 4 | 5 | 6 | 7 | 8 | 9 | 10 | 11 |
|----|---|---|---|---|---|---|---|---|---|---|----|----|
| 0 | 24 | 25 | 26 | 27 | 28 | 29 | 30 | 32 | 32 | 33 | 34 | 35 |
| 1 | 36 | 37 | 38 | 39 | 40 | 41 | 42 | 43 | 44 | 45 | 46 | 47 |
| 2 | 48 | 49 | 50 | 51 | 52 | 53 | 54 | 55 | 56 | 57 | 58 | 59 |
| 3 | 60 | 61 | 62 | 63 | 64 | 65 | 66 | 67 | 68 | 69 | 70 | 71 |
| 4 | 72 | 73 | 74 | 75 | 76 | 77 | 78 | 79 | 80 | 81 | 82 | 83 |
| 5 | 84 | 85 | 86 | 87 | 88 | 89 | 90 | 91 | 92 | 93 | 94 | 95 |
| 6 | 0 | 1 | 2 | 3 | 4 | 5 | 6 | 7 | 8 | 9 | 10 | 11 |
| 7 | 12 | 13 | 14 | 15 | 16 | 17 | 18 | 19 | 20 | 21 | 22 | 23 |

Thread Group Identifier 230
(Data Block Identifier 230)

Data Block 250 (Generated, Stored, and Maintained in Cache)

Data Block 240 (Generated, Stored, and Evicted from Cache)

Initial Row of Data to be Processed 312

Data Block of Initial Row to be Processed 310

*FIG. 3*

Between Second Stage and Third Stage of Data Processing of Data Blocks
Cache Access Hits Occurred for Rows 6-7
Cache Access Misses Occurred for Rows 0-5
(During Subsequent Third Stage, Cache Access Hits Will Occur for Rows 4-5)

Processing Data Storage Space
400

Thread Group Identifier 230
(Data Block Identifier 230)

| XY | 0 | 1 | 2 | 3 | 4 | 5 | 6 | 7 | 8 | 9 | 10 | 11 |
|---|---|---|---|---|---|---|---|---|---|---|---|---|
| 0 | 24 | 25 | 26 | 27 | 28 | 29 | 30 | 32 | 32 | 33 | 34 | 35 |
| 1 | 36 | 37 | 38 | 39 | 40 | 41 | 42 | 43 | 44 | 45 | 46 | 47 |
| 2 | 48 | 49 | 50 | 51 | 52 | 53 | 54 | 55 | 56 | 57 | 58 | 59 |
| 3 | 60 | 61 | 62 | 63 | 64 | 65 | 66 | 67 | 68 | 69 | 70 | 71 |
| 4 | 72 | 73 | 74 | 75 | 76 | 77 | 78 | 79 | 80 | 81 | 82 | 83 |
| 5 | 84 | 85 | 86 | 87 | 88 | 89 | 90 | 91 | 92 | 93 | 94 | 95 |
| 6 | 0 | 1 | 2 | 3 | 4 | 5 | 6 | 7 | 8 | 9 | 10 | 11 |
| 7 | 12 | 13 | 14 | 15 | 16 | 17 | 18 | 19 | 20 | 21 | 22 | 23 |

Data Block of Initial Row to be Processed and Maintained in the Cache 420

Initial Row of Data to be Processed and Maintained in the Cache 422

Initial Row of Data to be Processed 312

Data Block of Initial Row to be Processed 310

Data Block 240 (Generated, Stored, and Evicted from Cache)

Data Block 250 (Generated, Stored, and Maintained in Cache)

FIG. 4

*Between Second Stage and Third Stage of Data Processing of Data Blocks
Cache Access Hits Occurred for Rows 6-7
Cache Access Misses Occurred for Rows 0-5
(During Subsequent Third Stage, Cache Access Hits Will Occur for Rows 4-5)*

*Processing Data Storage Space 500*

Thread Group Identifier 230 (Data Block Identifier 230)

| XY | 0 | 1 | 2 | 3 | 4 | 5 | 6 | 7 | 8 | 9 | 10 | 11 |
|---|---|---|---|---|---|---|---|---|---|---|---|---|
| 0 | 48 | 49 | 50 | 51 | 52 | 53 | 54 | 55 | 56 | 57 | 58 | 59 |
| 1 | 60 | 61 | 62 | 63 | 64 | 65 | 66 | 67 | 68 | 69 | 70 | 71 |
| 2 | 72 | 73 | 74 | 75 | 76 | 77 | 78 | 79 | 80 | 81 | 82 | 83 |
| 3 | 84 | 85 | 86 | 87 | 88 | 89 | 90 | 91 | 92 | 93 | 94 | 95 |
| 4 | 0 | 1 | 2 | 3 | 4 | 5 | 6 | 7 | 8 | 9 | 10 | 11 |
| 5 | 12 | 13 | 14 | 15 | 16 | 17 | 18 | 19 | 20 | 21 | 22 | 23 |
| 6 | 24 | 25 | 26 | 27 | 28 | 29 | 30 | 32 | 32 | 33 | 34 | 35 |
| 7 | 36 | 37 | 38 | 39 | 40 | 41 | 42 | 43 | 44 | 45 | 46 | 47 |

Initial Row of Data to be Processed 512

Data Block of Initial Row to be Processed 510

Data Block 240 (Generated, Stored, and Evicted from Cache)

Data Block 250 (Generated, Stored, and Maintained in Cache)

*Processing Data Storage Arrangement 1000*

*Initial Stage of Data Processing of Data Blocks Each Initial Cache Access Results in a Miss (Cache Misses on Rows 0-7)*

| XY | 0 | 1 | 2 | 3 | 4 | 5 | 6 | 7 | 8 | 9 | 10 | 11 |
|---|---|---|---|---|---|---|---|---|---|---|---|---|
| 0 | 0 | 1 | 2 | 3 | 4 | 5 | 6 | 7 | 8 | 9 | 10 | 11 |
| 1 | 12 | 13 | 14 | 15 | 16 | 17 | 18 | 19 | 20 | 21 | 22 | 23 |
| 2 | 24 | 25 | 26 | 27 | 28 | 29 | 30 | 32 | 32 | 33 | 34 | 35 |
| 3 | 36 | 37 | 38 | 39 | 40 | 41 | 42 | 43 | 44 | 45 | 46 | 47 |
| 4 | 48 | 49 | 50 | 51 | 52 | 53 | 54 | 55 | 56 | 57 | 58 | 59 |
| 5 | 60 | 61 | 62 | 63 | 64 | 65 | 66 | 67 | 68 | 69 | 70 | 71 |
| 6 | 72 | 73 | 74 | 75 | 76 | 77 | 78 | 79 | 80 | 81 | 82 | 83 |
| 7 | 84 | 85 | 86 | 87 | 88 | 89 | 90 | 91 | 92 | 93 | 94 | 95 |

- Thread Group Identifier 230
- (Data Block Identifier 230)
- Data Block Type 250 (Generated, Stored, and Maintained in Cache)
- Data Block Type 240 (Generated, Stored, and Evicted from Cache)
- Initial Row of Data to be Processed 212
- Data Block of Initial Row to be Processed 210
- Initial Row of Data to be Processed and Maintained in the Cache 222
- Data Block of Initial Row to be Processed and Maintained in the Cache 220

*Processing Data Storage Arrangement 1100*

| XY | 0 | 1 | 2 | 3 | 4 | 5 | 6 | 7 | 8 | 9 | 10 | 11 |
|---|---|---|---|---|---|---|---|---|---|---|---|---|
| 0 | 95 | 94 | 93 | 92 | 91 | 90 | 89 | 88 | 87 | 86 | 85 | 84 |
| 1 | 83 | 82 | 81 | 80 | 79 | 78 | 77 | 76 | 75 | 74 | 73 | 72 |
| 2 | 71 | 70 | 69 | 68 | 67 | 66 | 65 | 64 | 63 | 62 | 61 | 60 |
| 3 | 59 | 58 | 57 | 56 | 55 | 54 | 53 | 52 | 51 | 50 | 49 | 48 |
| 4 | 47 | 46 | 45 | 44 | 43 | 42 | 41 | 40 | 39 | 38 | 37 | 36 |
| 5 | 35 | 34 | 33 | 32 | 31 | 30 | 29 | 28 | 27 | 26 | 25 | 24 |
| 6 | 23 | 22 | 21 | 20 | 19 | 18 | 17 | 16 | 15 | 14 | 13 | 12 |
| 7 | 11 | 10 | 9 | 8 | 7 | 6 | 5 | 4 | 3 | 2 | 1 | 0 |

Between First Stage and Second Stage of Data Processing of Data Blocks
Cache Access Hits for Rows 6-7 During Second Stage
Cache Access Misses for Rows 0-5 During Second Stage Thread Group Identifier 230
Initial Row of Data to be Processed 1112
Data Block of Initial Row to be Processed 1110
Data Block Type 250 (Generated, Stored, and Maintained in Cache)
Data Block Type 240 (Generated, Stored, and Evicted from Cache)

*FIG. 11*

*Processing Data Storage Arrangement 1300*

| XY | 0 | 1 | 2 | 3 | 4 | 5 | 6 | 7 | 8 | 9 | 10 | 11 |
|----|----|----|----|----|----|----|----|----|----|----|----|----|
| 0  | 0  | 1  | 2  | 3  | 4  | 5  | 6  | 7  | 8  | 9  | 10 | 11 |
| 1  | 12 | 13 | 14 | 15 | 16 | 17 | 18 | 19 | 20 | 21 | 22 | 23 |
| 2  | 24 | 25 | 26 | 27 | 28 | 29 | 30 | 32 | 32 | 33 | 34 | 35 |
| 3  | 36 | 37 | 38 | 39 | 40 | 41 | 42 | 43 | 44 | 45 | 46 | 47 |
| 4  | 48 | 49 | 50 | 51 | 52 | 53 | 54 | 55 | 56 | 57 | 58 | 59 |
| 5  | 60 | 61 | 62 | 63 | 64 | 65 | 66 | 67 | 68 | 69 | 70 | 71 |
| 6  | 72 | 73 | 74 | 75 | 76 | 77 | 78 | 79 | 80 | 81 | 82 | 83 |
| 7  | 84 | 85 | 86 | 87 | 88 | 89 | 90 | 91 | 92 | 93 | 94 | 95 |

Between Second Stage and Third Stage of Data Processing of Data Blocks
Cache Access Hits Occurred for Rows 7 to 6
Cache Access Misses Occurred for Rows 5 to 0
(During Subsequent Third Stage, Cache Access Hits Will Occur for Rows 0 to 1)

Thread Group Identifier 230

Data Block Type 250 (Generated, Stored, and Maintained in Cache)

Data Block Type 240 (Generated, Stored, and Evicted from Cache)

Initial Row of Data to be Processed 1312

Data Block of Initial Row to be Processed 1310

*FIG. 13*

EFFICIENT CACHE DATA STORAGE FOR ITERATIVE WORKLOADS

BACKGROUND

Description of the Relevant Art

Neural networks are used in a variety of applications in a variety of fields such as physics, chemistry, biology, engineering, social media, finance, and so on. Neural networks use one or more layers of nodes to classify data in order to provide an output value representing a prediction when given a set of inputs. Weight values are used to determine an amount of influence that a change in a particular input data value will have upon a particular output data value within the one or more layers of the neural network. The cost of using a trained neural network includes providing hardware resources that can process the relatively high number of computations and can support the data storage and the memory bandwidth for accessing parameters. The parameters include at least the input data values, the weight values, the bias values, and the activation values. If an organization cannot support the cost of using the trained neural network, then the organization is unable to benefit from the trained neural network.

The performance of one or more computing systems, such as computing systems that implement a neural network, depends on quick access to stored data. The memory access operations include read operations, write operations, memory-to-memory copy operations, and so forth. Several types of data-intensive applications rely on quick access to data storage to provide reliable high-performance for several local and remote programs and their users. The memory hierarchy transitions from relatively fast, volatile memory, such as registers on a processor die and caches either located on the processor die or connected to the processor die, to non-volatile and relatively slow memory. The interfaces and access mechanisms for the different types of memory also changes.

The available data bandwidth for lower levels of the memory hierarchy is relatively high. However, the achieved bandwidth becomes limited due to the lower response bandwidth. Therefore, when techniques are used to saturate the available bandwidth for accessing the lower levels of the memory hierarchy, the overall bandwidth is still limited since these techniques do not handle any inefficiencies in the response bandwidth.

In view of the above, efficient methods and mechanisms for efficiently processing memory requests are desired.

BRIEF DESCRIPTION OF THE DRAWINGS

FIG. 2 is a generalized block diagram of a data storage arrangement of data blocks being processed in a manner to efficiently process memory requests.

FIG. 3 is a generalized block diagram of a data storage arrangement of data blocks being processed in a manner to efficiently process memory requests.

FIG. 4 is a generalized block diagram of a data storage arrangement of data blocks being processed in a manner to efficiently process memory requests.

FIG. 5 is a generalized block diagram of a data storage arrangement of data blocks being processed in a manner to efficiently process memory requests.

FIG. 10 is a generalized block diagram of a data storage arrangement of data blocks being processed in a manner to efficiently process memory requests.

FIG. 11 is a generalized block diagram of a data storage arrangement of data blocks being processed in a manner to efficiently process memory requests.

FIG. 13 is a generalized block diagram of a data storage arrangement of data blocks being processed in a manner to efficiently process memory requests.

Figure 1:
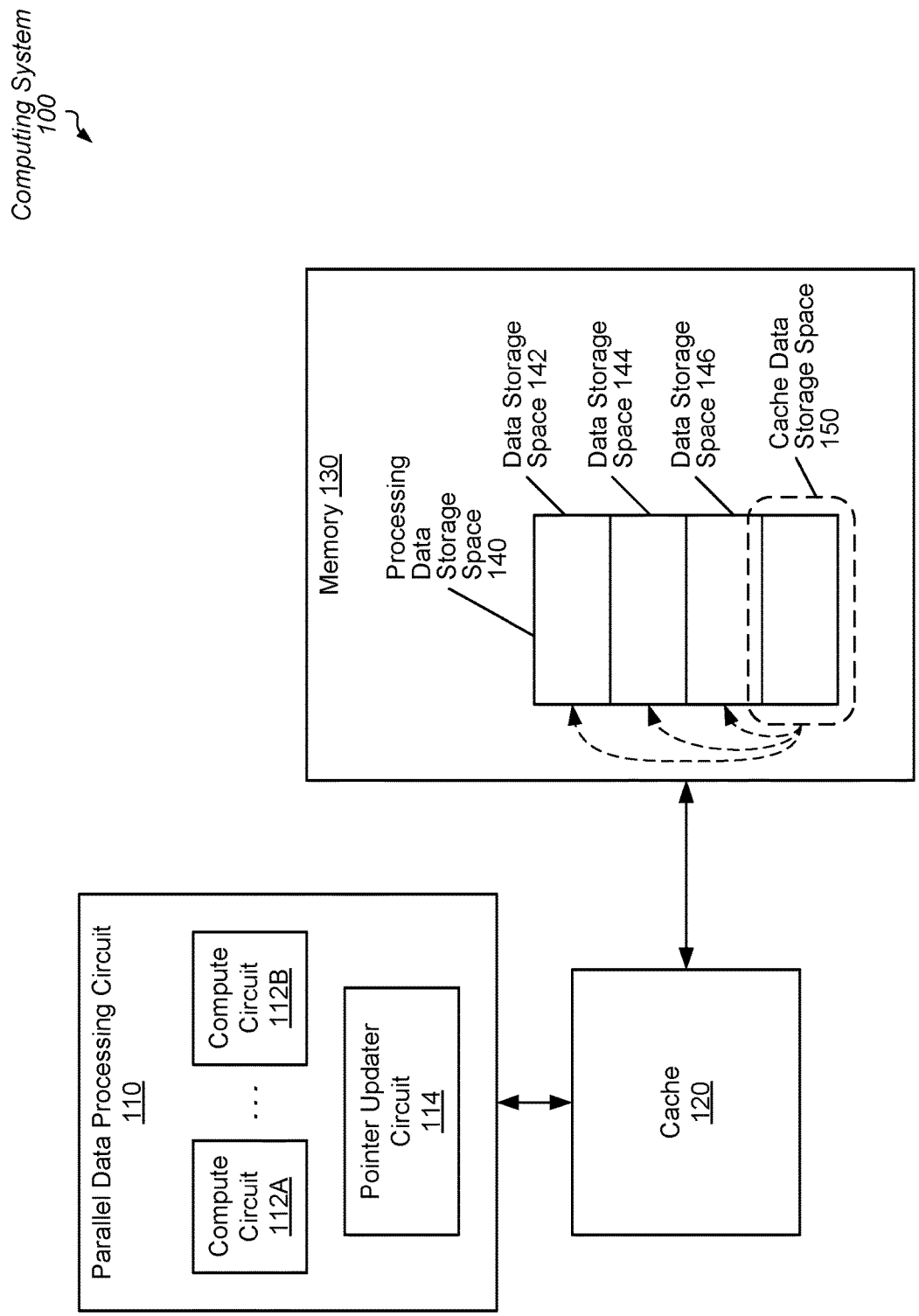
FIG. 1 is a generalized block diagram of a computing system that efficiently processes memory requests.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods for efficiently processing memory requests are contemplated. In various implementations, an integrated circuit includes multiple compute circuits, each capable of processing a data block of multiple data blocks. In some implementations, each of the multiple compute circuits includes multiple lanes of simultaneous execution of a single-instruction-multiple-data ("SIMD") microarchitecture. Multiple threads are grouped into thread groups, where a "thread group" is a partition of work executed in an atomic manner. In some implementations, a thread group includes instructions of a function call that operate concurrently on multiple data items within a data block. A scheduler assigns a particular one of multiple thread groups to a particular one of the multiple compute circuits. A memory includes storage space for storing the multiple data blocks. An amount of available data storage space of a cache is smaller than the storage space for storing the multiple data blocks. Therefore, many of the memory access requests generated by the multiple compute circuits result in cache misses. In an implementation, the cache represents a last level shared cache structure such as a level-three (L3) or other level.

To increase the number of cache hits in the cache during iterative stages of data processing of the multiple data blocks, a pointer updater circuit updates pointers that changes an order of data processing performed by the multiple compute circuits. As used herein, a "pointer" is a value that identifies a storage location in memory. These values used as pointers being updated by the pointer updater circuit can include one or more of a physical address, a logical address or virtual address, and an offset of one of a physical address, and a logical address or a virtual address. These values used as pointers being updated by the pointer updater circuit can also include one of a thread group identifier, a data block identifier, or another type of identifier used to indicate or specify a storage location in memory. The "pointer updater circuit" can also be referred to as "pointer updating circuitry," and an "updater circuit." In some implementations, one or more of a physical address and a logical address or virtual address is derived from a thread group identifier, a data block identifier, or another type of identifier used to indicate or specify a storage location in memory. For example, in some implementations, the pointer updater circuit updates a thread group identifier, a data block identifier, or another type of identifier used to indicate or specify a storage location in memory, and a processing circuit, which includes the compute circuits, generates one of a physical address, a logical address or a virtual address and an offset based on the updated thread group identifier, data block identifier, or other type of identifier.

In various implementations, the multiple compute circuits process data blocks in a contiguous manner, and the pointer updater circuit assigns data block identifiers in a contiguous manner beginning with an initial block to be processed by the multiple compute circuits. The pointer updater circuit detects an end of a stage of data processing of the multiple data blocks by the multiple compute circuits. This stage of data processing generated multiple data blocks of intermediate results. The pointer updater circuit sets a pointer to identify a storage location storing a data block of the intermediate results maintained in the cache. In various implementations, this data block of the intermediate results is an oldest data block of the intermediate results stored in the cache. The pointer updater circuit uses this pointer to identify an initial data block to begin data processing for a subsequent stage of data processing.

The pointer updater circuit assigns data block identifiers in a contiguous manner beginning with a next contiguous data block after the initial block to be processed by the multiple compute circuits. Therefore, memory requests for this initial data block and multiple subsequent contiguous data blocks result in cache hits. The pointer updater circuit accounts for the number of data blocks of intermediate results to increase or decrease for a particular stage of data processing when updating the pointer of an initial data block to use for the particular stage of data processing. Further details of these techniques for efficiently processing memory requests are provided in the following description of FIGS. 1-15.

Referring to FIG. 1, a generalized block diagram is shown of a computing system 100 that efficiently processes memory requests. In the illustrated implementation, the computing system 100 includes a parallel data processing circuit 110, a cache 120, and a memory 130. The cache 120 and the memory 130 are used in a cache memory hierarchy of the computing system 100. The parallel data processing circuit 110 includes hardware, such as circuitry, that processes data. For example, the parallel data processing circuit 110 includes at least the compute circuits 112A-112B. An example of the data to process includes the data stored in the processing data storage space 140 (or storage space 140) of the memory 130. The storage space 140 includes the sum of the data storage space 142 (or storage space 142), the storage space 144, the storage space 146, and the cache data storage space 150. In some implementations, each of the storage space 142, the storage space 144, the storage space 146, and the cache data storage space 150 has a same size. In other implementations, at least one of the storage space 142, the storage space 144, the storage space 146, and the cache data storage space 150 has a different size than the other storage spaces. The available data storage capacity of the cache 120, which is represented as the cache data storage space 150, is smaller than the storage space 140. The dashed arrows in the memory 130 illustrate that the placement of the copy of data in the cache data storage space 150, which represents the copy of data currently stored in the cache 120, can be moved within the storage space 140.

Clock sources, such as phase lock loops (PLLs), interrupt controllers, power controllers, memory controllers, interfaces for input/output (I/O) devices, and so forth are not shown in FIG. 1 for ease of illustration. It is also noted that the number of components of the computing system 100 and the number of subcomponents for those shown in FIG. 1 can vary from implementation to implementation. There can be more or fewer of each component/subcomponent than the number shown for the computing system 100.

Since the cache data storage space 150 is smaller than the storage space 140, many of the memory access requests generated by the parallel data processing circuit 110 result in cache misses when these memory access requests (or memory requests) are sent to the cache 120. The pointer updater circuit 114 maintains pointers that identify storage locations in the memory 130 that store data blocks. In some implementations, the size of a data block is a size of a cache line (or cache block). In other implementations, the size of the data block can be any size based on design requirements such as multiple cache lines. The storage space 140 of the memory 130 stores these data blocks. To increase the number of cache hits in the cache 120, the pointer updater circuit 114 updates pointers that changes an order of data processing performed by the parallel data processing circuit 110.

As described earlier, a "pointer" is a value that identifies a storage location in memory. These values used as pointers being updated by the pointer updater circuit 114 can include one or more of a physical address, a logical address or virtual address, and an offset of one of a physical address, and a logical address or a virtual address. These values used as pointers being updated by the pointer updater circuit 114 can also include one of a thread group identifier, a data block identifier, or another type of identifier used to indicate or specify a storage location in memory. In some implementations, one or more of a physical address and a logical address (or virtual address) is derived from a thread group identifier, a data block identifier, or another type of identifier used to indicate or specify a storage location in memory. For example, in some implementations, the pointer updater circuit 114 updates a thread group identifier, a data block identifier, or another type of identifier used to indicate or specify a storage location in memory, and the parallel data processing circuit 110 generates one of a physical address, a logical address or a virtual address, and an offset based on the updated thread group identifier, data block identifier, or other type of identifier.

In some implementations, the functionality of the computing system 100 is included as components on a single die, such as a single integrated circuit. In other implementations, the functionality of the computing system 100 is included as multiple dies on a system-on-a-chip (SOC). In other implementations, the components are individual dies in a system-in-package (SiP) or a multi-chip module (MCM). In yet other implementations, the multiple components of the computing system 100 are individual dies or chips on a printed circuit board. In various implementations, the computing system 100 is used in a desktop, a portable computer, a mobile device, a server, a peripheral device, or other.

In some implementations, the hardware of the parallel data processing circuit 110 (or processing circuit 110) uses a single-instruction-multiple-data ("SIMD") microarchitecture that includes the multiple compute circuits 112A-112B, each with multiple parallel execution lanes. In some implementations, the processing circuit 110 is a graphics processing unit (GPU) on a graphics processing card inserted in a motherboard, an application specific integrated circuit (ASIC), a field programmable gate array (FPGA), an integrated GPU located alongside a host processor (not shown), or other. In such an implementation, a particular combination of the same instruction and a particular data item of multiple data items is referred to as a "work item." A work item is also referred to as a thread.

The multiple work items (or multiple threads) are grouped into thread groups, where a "thread group" is a partition of work executed in an atomic manner. In some implementations, a thread group includes instructions of a function call that operate on multiple data items concurrently. As used herein, a "thread group" is also referred to as a "work block" or a "wavefront." Tasks performed by the processing circuit 110 can be grouped into a "workgroup" that includes multiple thread groups (or multiple wavefronts). The hardware, such as circuitry, of a scheduler (not shown) scheduler divides the workgroup into separate thread groups (or separate wavefronts), and assigns the thread groups to the compute circuits 112A-112B. For example, the scheduler assigns a particular thread group of a workgroup to a particular one of the compute circuits 112A-112B. In an implementation, each of the multiple compute circuits 112A-112B is a SIMD circuit that includes 64 lanes of execution. Therefore, each of the compute circuits 112A-112B is able to simultaneously process 64 threads in an atomic manner, and a thread group has a size of 64 threads. In other implementations, the thread groups have another size based on design requirements.

The address space of the computing system 100 is divided among multiple memories. In some designs, system memory, such as the memory 130, is implemented with one of a variety of dynamic random-access memories (DRAMs), which includes multiple memory devices, each for servicing memory accesses within a particular address range. When the memory 130 is used as system memory, the memory 130 is filled with instructions and data from main memory (not shown) implemented with one of a variety of non-volatile storage devices such as a hard disk drive (HDD) or a solid-state drive (SSD). In various implementations, the address space includes a virtual address space, which is partitioned into a particular page size with virtual pages mapped to physical memory frames. These virtual-to-physical address mappings are stored in a page table in the system memory.

In some designs, access permissions are stored with corresponding virtual-to-physical address mappings. Any local caches (not shown) of the processing circuit 110, the cache 120, the memory 130 used as system memory, and main memory (not shown) are associated with one or more levels of a memory hierarchy. The memory hierarchy transitions from relatively fast, volatile memory, such as registers on a semiconductor die of the processing circuit 110 and caches either located on the processor die or connected to the processor die, such as cache 120, to non-volatile and relatively slow memory.

In some implementations, the faster, volatile memory is considered to be at the top or at the highest level of the memory hierarchy, whereas, the slower, non-volatile memory is considered to be at the bottom or the lowest level of the memory hierarchy. In these implementations, a first level of the memory hierarchy located closer to the faster, volatile memory of the hierarchy than a second level of the memory hierarchy is considered to be at a "higher" level than the second level. In other implementations, the slower, non-volatile memory is considered to be at the top or at the highest level of the memory hierarchy. Although both ways of describing the memory hierarchy are possible and contemplated, in the following description, the faster, volatile memory is considered to be at the top or at the highest level of the memory hierarchy. Therefore, the higher levels of the memory hierarchy include the faster, volatile memory, such as processor registers and level-one (L1) local caches, while the lower levels of the memory hierarchy include the non-volatile, slower memory such as a hard disk drive (HDD) or a solid-state drive (SSD).

In an implementation, the cache 120 represents a last level shared cache structure such as a level-three (L3) or other level. One of the compute circuits 112A-112B generates a memory access request that misses in a corresponding local cache. When the cache memory subsystem of the processing circuit 110 is unable to locate the requested cache line, the processing circuit 110 sends a miss request to the cache 120. The cache 120 services the miss request, if the cache 120 is able to locate the requested cache line. If not, the system memory (memory 130) and/or main memory sends a cache fill line with the requested cache line (or cache block) to the cache 120 and local caches of the processing circuit 110 in order to complete the original memory request generated by one of the compute circuits 112A-112B.

In some implementations, the processing circuit 110 processes the data stored in the storage space 140 multiple times in an iterative manner. During the initial iteration (initial stage of data processing), each memory request generated by the compute circuits 112A-112B that targets this data results in a cache miss. For example, the compute circuits 112A-112B request the data stored in the storage space 142, which results in cache misses. A copy of the data stored in the storage space 142 is retrieved from the memory 130 and stored in the cache 120. A copy is then retrieved by the requesting one of the compute circuits 112A-112B from the cache 120. Later, the compute circuits 112A-112B request the data stored in the storage space 144, which results in cache misses. A copy of the data stored in the storage space 144 is retrieved from the memory 130 and stored in the cache 120. The copy of the data stored in the storage space 142 is overwritten in the cache 120 by the copy of the data stored in the storage space 144. A copy is then retrieved by the requesting one of the compute circuits 112A-112B from the cache 120. Later, the compute circuits 112A-112B request the data stored in the storage space 146, which results in cache misses. The steps repeat such as the copy of the data stored in the storage space 144 is overwritten in the cache 120 by the copy of the data stored in the storage space 146.

As described in the above description, in some implementations, the intermediate results overwrite the data stored in the storage space 140. In other implementations, a new storage space in the memory 130 is used to store the intermediate results, and the compute circuits 112A-112B use this new storage space for a subsequent stage of data processing. However, the data in the cache 120 is overwritten as the intermediate results are generated by the compute circuits 112A-112B. After the initial stage of data processing has been completed on the data blocks stored in the storage space 140, during the subsequent second stage of data processing, if the compute circuits 112A-112B begin at the start of the data stored in the storage space 142, each memory request generated by the compute circuits 112A-112B that targets this data results in a cache miss. Following, the copy of the intermediate results stored in the cache data storage space 150 and the memory 130 are overwritten in the cache 120. Near the end of the second stage of data processing when the compute circuits 112A-112B complete data processing of the data stored in the storage spaces 142-146, compute circuits 112A-112B generate memory requests for the data stored in the cache data storage space 150. A copy of this data was previously present in the cache 120 at the start of the second stage of data processing, but now, the memory requests targeting this copy of the data result in cache misses.

To increase the number of cache hits in the cache 120, the pointer updater circuit 114 updates pointers that changes an order of data processing performed by the parallel data processing circuit 110. For example, after the initial stage of data processing has been completed on the data blocks stored in the storage space 140, during the start of the subsequent second stage of data processing, the pointer updater circuit 114 updates pointers that cause the compute circuits 112A-112B to generate memory requests targeting data stored in the cache data storage space 150, rather than the storage space 142. A copy of this data is currently stored in the cache 120 at the start of the second stage of data processing. Therefore, the memory requests targeting this copy of the data result in cache hits. The cache hits continue for the memory requests targeting data stored in the cache 120 that is a copy of the data stored in the cache data storage space 150.

Although the memory requests targeting data stored in the cache 120 result in cache hits at the start of the subsequent second stage of data processing, the later memory requests targeting data stored in the cache 120 that is a copy of the data stored in the storage spaces 142, 144 and 146 result in cache misses. However, the cache hits for the memory requests targeting data stored in the cache 120 that is a copy of the data stored in the cache data storage space 150 cause a decrease in the latency to perform the subsequent second stage of data processing. Therefore, performance increases. In addition, the decrease in the amount of data transferred from the memory 130 to the cache 120 also reduces power consumption as well as the latency.

After the second stage of data processing has been completed on the data blocks stored in the storage space 140, during the start of the subsequent third stage of data processing, the pointer updater circuit 114 updates pointers (addresses of memory requests, thread group identifiers, and/or data block identifiers) that cause the compute circuits 112A-112B to generate memory requests targeting data stored in the storage space 146, rather than the cache data storage space 150. A copy of this data is currently stored in the cache 120 at the start of the third stage of data processing. Therefore, the memory requests targeting this copy of the data result in cache hits. The pointer updater circuit 114 continues to perform pointer updates in this manner resulting in cache hits for a portion of the data stored in the storage space 140. These pointer updates increase performance and reduce power consumption of the computing system 100.

Turning now to FIG. 2, a generalized block diagram is shown of processing data storage arrangement 200 used to efficiently process memory requests. The processing data storage arrangement 200 (or storage arrangement 200) includes multiple data blocks stored in a contiguous manner arranged as rows in a horizontal "X" direction and columns in a vertical "Y" direction. It is noted that although the terms "left," "right," "horizontal," "vertical," "row," "column," "top," and "bottom" are used to describe data storage arrangements and components of an integrated circuit, the meaning of the terms can change as circuitry is rotated, flipped, or otherwise viewed from a different perspective. Although eight rows are shown identified with row identifiers 0 to 7, and each row has 12 data blocks identified with column identifiers 0 to 11, in other implementations, another number of rows and another number of data blocks per row are stored.

In some implementations, the size of a data block is a size of a cache line (or cache block). In other implementations, the size of the data block can be any size based on design requirements such as multiple cache lines. The circuitry of a memory, such as a system memory of a computing system, stores the data blocks. The circuitry of storage devices of the memory includes a storage location for each of the data blocks, and these storage locations are addressable as rows and columns in an array. In some implementations, the memory has rows larger than the rows shown in the storage arrangement 200. For example, control circuitry within one of a variety of dynamic random-access memories (DRAMs) used as system memory performs complex transactions such as activation (opening) transactions and precharge of signal (e.g., data and control lines) within the DRAM. The control circuitry performs these transactions once to access an identified row and once to put back the modified contents stored in the row buffer to the identified row during a close transaction. Examples of the different DRAM transactions are an activation/open transaction, a column access transaction, a read access transaction, a write access transaction, and a precharge/close transaction. Often, the activation and precharge transactions have significantly higher latencies than the read access and write access transactions.

The memory receives memory requests, such as memory read requests and memory write requests, that target the data blocks stored in these storage locations. Each of the data blocks has a corresponding identifier such as the data block identifier 230. In an implementation, the data block identifier also corresponds to a thread group identifier. The pointer updater circuit maintains a mapping between thread group identifiers and addresses that point to storage locations in memory. In such an implementation, a data block represents the data items of a particular thread group that is assigned to a particular compute circuit of multiple compute circuits of a parallel data processing circuit. In some implementations, the parallel data processing circuit processes the data blocks of the storage arrangement 200 multiple times in an iterative manner. During each stage of data processing, the compute circuits of the parallel data processing circuit begin at an initial row, and process the rows in an in-order manner. During the initial stage of data processing, the compute circuits of the parallel data processing circuit begin at the initial row of data to be processed (or initial row 212). The initial row 212 includes the initial data block 210, which is the data block of the initial row to be processed.

After the in-order processing of the data blocks, the storage arrangement 200 includes data blocks of the data block type 240 in rows 0-5. The data block type 240 includes data blocks that have been generated, stored, and evicted from a cache such as a last-level cache. In various implementations, the hardware of the cache controller of the cache supports a read-cache-data-and-evict-cache-data operation that places the cache line that has recently been read as the cache line to first evict for line replacement. The cache controller can also utilize a most-recently-used (MRU) cache replacement policy. After the in-order processing of the data blocks, the storage arrangement 200 also includes data blocks of the data block type 250 in rows 6-7. The data block type 250 includes data blocks that have been generated, stored, and maintained in the cache such as the last-level cache. The initial row 222 includes the data block of the initial row that has data blocks of the data block type 250 (or the initial data block 220).

After the initial stage of data processing has been completed on the data blocks in the storage arrangement 200, during the subsequent second stage of data processing, if the compute circuits begin at the initial row 212, rather than the initial row 222, each memory request generated by the compute circuits that targets this data results in a cache miss. To increase the number of cache hits in the cache, such as the last-level cache, a pointer updater circuit of the parallel data processing circuit updates pointers that changes an order of data processing performed by the parallel data processing circuit. For example, after the initial stage of data processing has been completed on the data blocks stored in the storage arrangement 200, during the start of the subsequent second stage of data processing, the pointer updater circuit updates pointers that cause the compute circuits to generate memory requests targeting data stored in the initial row 222 rather than the initial row 212. A copy of this data of the rows 6-7 is currently stored in the cache at the start of the second stage of data processing. Therefore, the memory requests targeting this copy of the data result in cache hits. The pointer updater circuit continues to perform pointer updates in this manner resulting in cache hits for a portion of the data stored in the storage arrangement 200. These pointer updates increase performance and reduce power consumption of the computing system.

Referring to FIG. 3, a generalized block diagram is shown of processing data storage arrangement 300 used to efficiently process memory requests. Data types and identifiers described earlier are numbered identically. The processing data storage arrangement 300 (or storage arrangement 300) includes multiple data blocks stored in a contiguous order after an initial stage of data processing has completed and prior to a subsequent second stage of data processing. To increase the number of cache hits in the cache, such as the last-level cache, a pointer updater circuit of the parallel data processing circuit updates pointers (addresses of memory requests, thread group identifiers, and/or data block identifiers) that change an order of data processing performed by the parallel data processing circuit. For example, after the initial stage of data processing has been completed, during the start of the subsequent second stage of data processing, the pointer updater circuit updates pointers that cause the compute circuits to generate memory requests targeting data stored in the initial row 312 (row 6), rather than row 0. The initial row 312 includes the initial data block 310, which is the data block of the initial row to be processed. A copy of this data of the rows 6-7 that include the data blocks 0-23 is currently stored in the cache at the start of the second stage of data processing.

In addition, the pointer updater circuit is aware of the number of data blocks to be generated by a particular stage of data processing. Therefore, the pointer updater circuit is able to update pointers (addresses of memory requests, thread group identifiers, and/or data block identifiers) in a manner to increase cache hits for a next immediate subsequent stage of data processing. For the implementations shown in storage arrangements 200-500 (of FIGS. 2-5), the number of data blocks of the data to be generated is 96 data blocks (or 8 rows) and the number of data blocks that can be stored in the cache is 24 data blocks (or 2 rows). Since the number of data blocks of the data to be generated remains constant at 96 blocks (or 8 rows), the offset remained at 96 data blocks (or 8 rows) less 24 data blocks (or 2 rows), which provides an offset equal to 72 data blocks (or 6 rows forward wrapping around the range of data block identifiers, or 2 rows backward wrapping around the range of data block identifiers).

The pointer updater circuit determines the thread block identifier (or data block identifier) of the next initial thread group to execute based on a difference between this thread block identifier and the current initial thread block identifier being equal to the offset. For the implementation shown in storage arrangement 300, the current initial thread block group identifier is 0, and the thread block identifier (or data block identifier) of the next initial thread group to execute is 72, which is based on the offset of 72 data blocks.

As shown, row 4 begins with the thread group identifier 72 for the next immediate subsequent stage of data processing. Therefore, the pointer updater circuit is aware, prior to the next immediate subsequent stage of data processing, where the next initial data block will be located that will be later assigned the initial thread group identifier (thread group identifier 0). The assignment of the thread group identifiers for the next immediate stage of data processing is shown in the upcoming storage arrangement 400 (of FIG. 4).

Referring to FIG. 4, a generalized block diagram is shown of processing data storage arrangement 400 used to efficiently process memory requests. Data types and identifiers described earlier are numbered identically. The processing data storage arrangement 400 (or storage arrangement 400) includes multiple data blocks stored in a contiguous order between a second stage of data processing and a subsequent third stage of data processing. To increase the number of cache hits in the cache, such as the last-level cache, a pointer updater circuit of the parallel data processing circuit updates pointers that changes an order of data processing performed by the parallel data processing circuit. For example, after the second stage of data processing has been completed, during the start of the subsequent third stage of data processing, the pointer updater circuit updates pointers that cause the compute circuits to generate memory requests targeting data stored in the initial row 422 (row 4), rather than row 0 or row 6. The initial row 422 includes the initial data block 420, which is the data block of the initial row to be processed. A copy of this data of the rows 4-5 that include the data blocks 72-95 is currently stored in the cache at the start of the third stage of data processing. At the start of the third stage of data processing, the pointer updater circuit can rename the data block identifiers 230 (or thread group identifiers) from 72-95 in the rows 4-5 to identifiers 0-23 as further described in the upcoming description of the processing data storage arrangement 500.

Referring to FIG. 5, a generalized block diagram is shown of processing data storage arrangement 500 used to efficiently process memory requests. Data types and identifiers described earlier are numbered identically. The processing data storage arrangement 500 (or storage arrangement 500) includes multiple data blocks stored in a contiguous order between a second stage of data processing and a subsequent third stage of data processing. To increase the number of cache hits in the cache, such as the last-level cache, a pointer updater circuit of the parallel data processing circuit updates pointers that changes an order of data processing performed by the parallel data processing circuit. For example, after the second stage of data processing has been completed, during the start of the subsequent third stage of data processing, the pointer updater circuit updates pointers that cause the compute circuits to generate memory requests targeting data stored in the initial row 512 (row 4) to be processed during the third stage of data processing. The initial row 512 includes the data block 510, which is the data block of the fourth row to be processed. A copy of this data of the rows 4-5 that include the data blocks 0-23 is currently stored in the cache at the start of the second stage of data processing.

As described earlier, the pointer updater circuit is aware of the number of data blocks to be generated by a particular stage of data processing. Therefore, the pointer updater circuit is able to update pointers (addresses of memory requests, thread group identifiers, and/or data block identifiers) in a manner to increase cache hits for a next immediate subsequent stage of data processing. For the implementations shown in storage arrangements 200-500 (of FIGS. 2-5), the number of data blocks of the data to be generated is 96 data blocks (or 8 rows), the number of data blocks that can be stored in the cache is 24 data blocks (or 2 rows), and the offset is 72 data blocks (or 6 rows forward wrapping around the range of data block identifiers, or 2 rows backward wrapping around the range of data block identifiers). For the implementation shown in storage arrangement 500, the current initial thread block group identifier is 0, and the thread block identifier (or data block identifier) of the next initial thread group to execute is 72, which is based on the offset of 72 data blocks. The size of 72 data blocks is based on a total amount of available data storage in the cache such as the last-level cache.

As shown, row 2 begins with the thread group identifier 72 for the next immediate subsequent stage of data processing. Therefore, the pointer updater circuit is aware, prior to the next immediate subsequent stage of data processing, where is the next initial data block will be located that will be later assigned the initial thread group identifier. As used herein, the term "backward rolling offset technique" refers to a technique that when performed by the pointer updater circuit updates a pointer by adding an offset to the pointer where the pointer specifies a memory storage location of an initial data block of a present stage of data processing. The pointer updater circuit determines the offset to be equal to a difference between a total number of data blocks to be generated by a next stage of data processing and a number of data blocks generated by the present stage of data processing that can be concurrently stored in the cache such as the last-level cache. The technique also includes the pointer updater circuit assigning data block identifiers in a contiguous manner beginning with the initial data block and the compute circuits process data blocks in a contiguous manner. The pointer updater circuit and the compute circuits are using the backward rolling offset technique to generate the storage arrangements 200-500 (of FIGS. 2-5), which increases cache hits during iterative stages of data processing.

Figure 6:
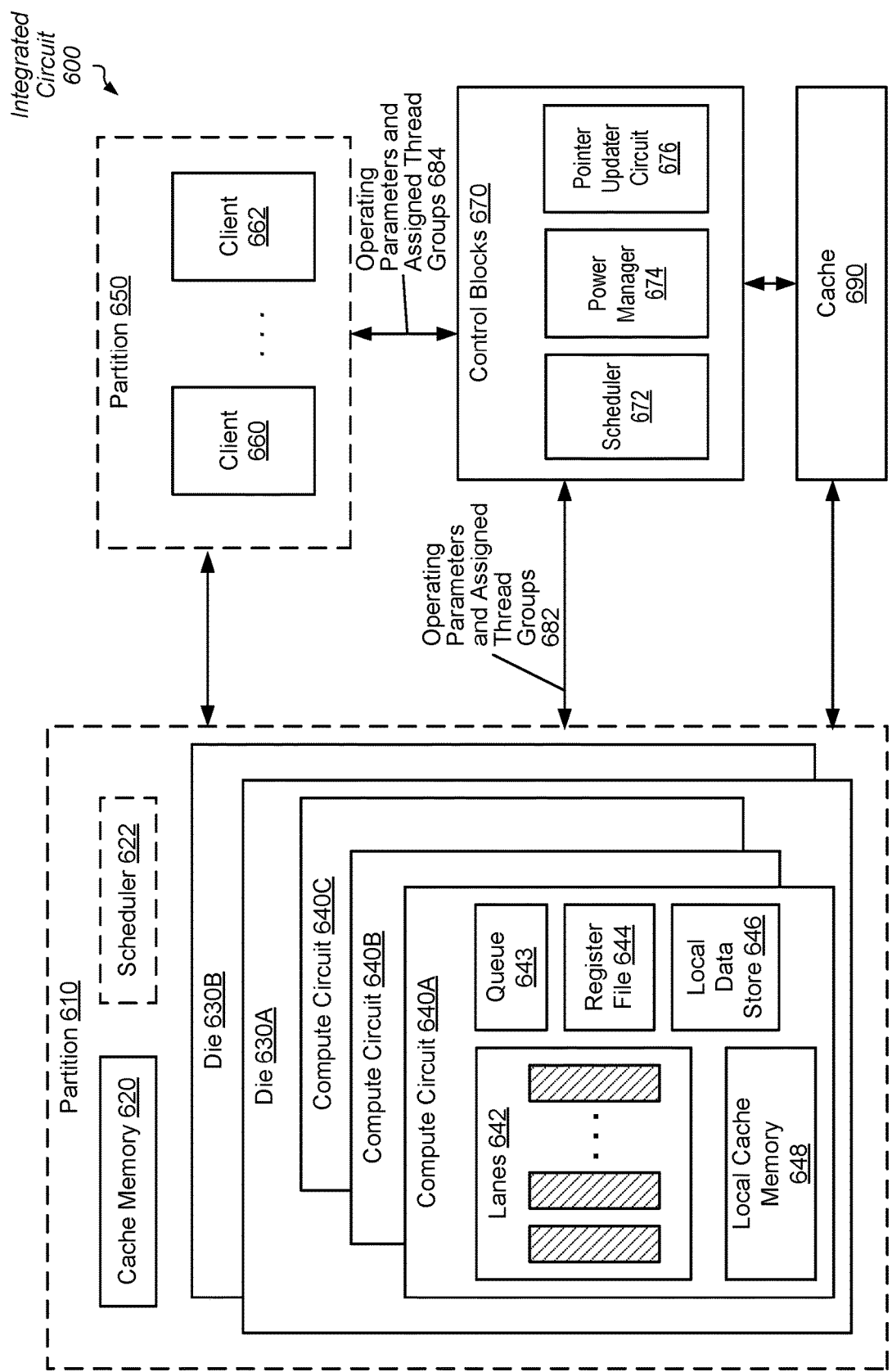
FIG. 6 is a generalized block diagram of an integrated circuit that efficiently processes memory requests.

Referring to FIG. 6, a generalized block diagram is shown of an integrated circuit 600 that efficiently processes memory requests. In the illustrated implementation, the integrated circuit 600 includes two partitions such as partition 610 and partition 650. Each of the partitions 610 and 650 includes components for processing thread groups. Partition 610 includes the cache memory 620 shared by the dies 630A and 630B. The die 630A includes the compute circuits 640A, 640B and 640C. Partition 650 includes the clients 660-662. The control blocks 670 includes the scheduler 672, the power manager 674, and the pointer updater circuit 676. In various implementations, the pointer updater circuit 676 updates pointers to increase cache hits in the cache 690. In an implementation, the control blocks 670 are circuitry of a microcontroller of the integrated circuit 600.

A communication fabric, a memory controller, interrupt controllers, and phased locked loops (PLLs) or other clock generating circuitry are not shown for ease of illustration. In some implementations, the functionality of the integrated circuit 600 is included as components on a single die such as a single integrated circuit. In an implementation, the functionality of the integrated circuit 600 is included as one die of multiple dies on a system-on-a-chip (SOC). In other implementations, the functionality of the integrated circuit 500 is implemented by multiple, separate dies that have been fabricated on separate silicon wafers and placed in system packaging known as multi-chip modules (MCMs). In various implementations, the integrated circuit 600 is used in a desktop, a portable computer, a mobile device, a server, a peripheral device, or other.

In an implementation, the integrated circuit 600 is a three-dimensional (3D) stacked integrated circuit (IC) that uses three-dimensional (3D) packaging. This type of packaging is referred to as a System in Package (SiP). A SiP includes one or more three-dimensional integrated circuits (3D ICs) that includes two or more layers of active electronic components integrated both vertically and/or horizontally into a single circuit. Die-stacking technology is a fabrication process that enables the physical stacking of multiple separate semiconductor dies together in a same package with high-bandwidth and low-latency interconnects. In some implementations, the dies are stacked side by side on a silicon interposer, and/or vertically directly on top of each other. In some implementations, the dies 630A-630B are chiplets. As used herein, a "chiplet" is also referred to as a "functional block," or an "intellectual property block" (or IP block). However, a "chiplet" is a semiconductor die (or die) fabricated separately from other dies, and then interconnected with these other dies in a single integrated circuit in the multi-chip module (MCM). A chiplet is a type of functional block. However, a functional block is a term that also describes blocks fabricated with other functional blocks on a larger semiconductor die such as a system-on-a-chip (SOC). Therefore, a chiplet is a subset of "functional blocks" in a semiconductor chip.

In some implementations, each of the partitions 610 and 650 is assigned to a respective power domain. In other implementations, each of the partitions 610 and 650 is assigned to a same power domain. A power domain includes at least operating parameters such as at least an operating power supply voltage and an operating clock frequency. A power domain also includes control signals for enabling and disabling connections to clock generating circuitry and one or more power supply references. In the information 682, the partition 610 receives operating parameters of a first power domain from the power manager 674. In the information 684, the partition 650 receives operating parameters of a second power domain from the power manager 674.

In some implementations, the scheduler 672 of the control blocks 670 schedules thread groups on the compute circuits 640A-640C of the partition 610. In other implementations, the scheduler 622 of the partition 610 schedules thread groups on the compute circuits 640A-640C. The clients 660-662 include a variety of types of circuits such as a central processor (CPU), a digital signal processor (DSP), an application specific integrated circuit (ASIC), a field programmable gate array (FPGA), multimedia circuitry, and so forth. Each of the clients 660-662 is capable of processing work blocks of a variety of workloads. In some implementations, work blocks scheduled on the partition 610 include wavefronts (thread groups) and work blocks scheduled on the partition 650 include instructions operating on a single data item not grouped into wavefronts.

In one implementation, the integrated circuit 600 is a graphics processor (GPU). The circuitry of the dies 630A and 630B of partition 610 process highly data parallel applications. The die 630A includes the multiple compute circuits 640A-640C, each with multiple lanes 642. In various implementations, the die 630B includes similar components as the die 630A. In some implementations, the lanes 642 operate in lockstep. In various implementations, the data flow within each of the lanes 642 is pipelined. Pipeline registers are used for storing intermediate results, and circuitry for arithmetic logic units (ALUs) perform integer arithmetic, floating-point arithmetic, Boolean logic operations, branch condition comparisons and so forth. These components are not shown for ease of illustration. Each of the computation circuits within a given row across the lanes 642 is the same computation circuit. Each of these computation circuits operates on a same instruction, but different data associated with a different thread. As described earlier, a number of work items are grouped into a wavefront (thread group) for simultaneous execution by multiple SIMD execution lanes such as the lanes 642 of the compute circuits 640A-640C. Each data item is processed independently of other data items, but the same sequence of operations of the subroutine is used.

As shown, each of the compute circuits 640A-640C also includes a respective queue 643 for storing assigned thread groups, register file 644, a local data store 646, and a local cache memory 648. In some implementations, the local data store 646 is shared among the lanes 642 within each of the compute circuits 640A-640C. In other implementations, a local data store is shared among the compute circuits 640A-640C. Therefore, it is possible for one or more of lanes 642 within the compute circuit 640A to share result data with one or more lanes 642 within the compute circuit 640A based on an operating mode.

In an implementation, the queue 643 is implemented as first-in, first-out (FIFO) buffer. Each queue entry of the queue 643 is capable of storing an assigned thread group received from the scheduler 622 (or the scheduler 672). Each queue entry can also be referred to as a "slot." A slot stores program state of the assigned thread group. In various implementations, the compute circuits 640A-640C maintain a count of available slots, or queue entries, in the queues that store assigned thread groups. The compute circuits 640A-640C send this count as information to the scheduler 622 (or the scheduler 672). Although an example of a single instruction multiple data (SIMD) micro-architecture is shown for the compute resources 630, other types of highly parallel data micro-architectures are possible and contemplated.

The high parallelism offered by the hardware of the dies 630A-630B can be used for simultaneously rendering multiple pixels, but it is also capable of simultaneously processing the multiple data elements of the scientific, medical, finance, encryption/decryption, and other computations. In addition, the high parallelism offered by the hardware of the dies 630A-630B can be used for supporting a data model that implements one of a variety of types of a neural network. Examples of the types of a neural network are one of multiple types of convolutional neural networks, deep neural networks, and recurrent neural networks. A neural network classifies data in order to provide output data that represents a prediction when given a set of inputs. To do so, the neural network uses an input layer, one or more hidden layers, and an output layer.

In some implementations, a U-Net architecture is used. The U-Net (or UNet) architecture uses a convolutional neural network that was developed for processing biomedical images. As a convolutional neural network, the U-Net architecture receives image data as an input, and generates a label that identifies the image and possibly locates an area of abnormality within the image. Therefore, the U-Net architecture performs image segmentation, rather than simply image classification, by performing both classification and localization. The U-Net architecture is also being used in other applications such as image recognition in self-driving cars, satellites, and so forth. During a contracting path, the U-Net neural network performs classification of an object within an image, and during an expansive path, the U-Net neural network performs localization of the object within the image. It is noted that while a U-net architecture is discussed, this is merely for purposes of discussion. The methods and mechanisms disclosed herein are applicable to any of architectures other than U-Net.

The U-Net neural network performs multiple iterations of convolutions. These iterations are multiple stages of data processing. The scheduler 672 assigns thread groups of a particular stage of data processing to the compute circuits 640A-640B. In an implementation, each of the compute circuits 640A-640B is used as a compute shader. Each thread group is assigned to one of the compute circuits 640A-640B. In an implementation, a thread group uses data of one data block of multiple data blocks of that particular stage of data processing. In an implementation, the data includes 96 data blocks such as in the storage arrangements 200-500 (of FIGS. 2-5). Unlike the storage arrangements 200-500, though, the amount of data used for different stages of data processing (different convolutions) can vary in the number of data blocks. For an expansive path, the number of data blocks can increase to more than 96 data blocks, and for a contracting path, the number of data blocks can decrease to less than 96 data blocks. The amount of data being generated between back-to-back convolutions expands and contracts during the use of the U-Net convolutional neural network. When the scheduler 672 assigns thread groups of a subsequent convolution of the U-Net neural network, the scheduler 672 "dispatches" or performs "dispatch" of the subsequent convolution.

In various implementations, the pointer updater circuit 676 has the same functionality as the pointer updater circuit 114 (of FIG. 1). For a dispatch of a subsequent convolution, the pointer updater circuit 676 updates pointers and thread group identifiers to increase the number of cache hits in the cache 690. In an implementation, the size of the cache 690 is 128 megabytes (MB), but the amount of data being generated during many convolutions of the U-Net neural network surpass hundreds of megabytes. Therefore, the cache 690 is unable to store all of the data to be used in a subsequent convolution. The pointer updater circuit 676 updates the thread group identifiers in a manner as shown in the storage arrangements 200-500 (of FIGS. 2-5).

Figure 7:
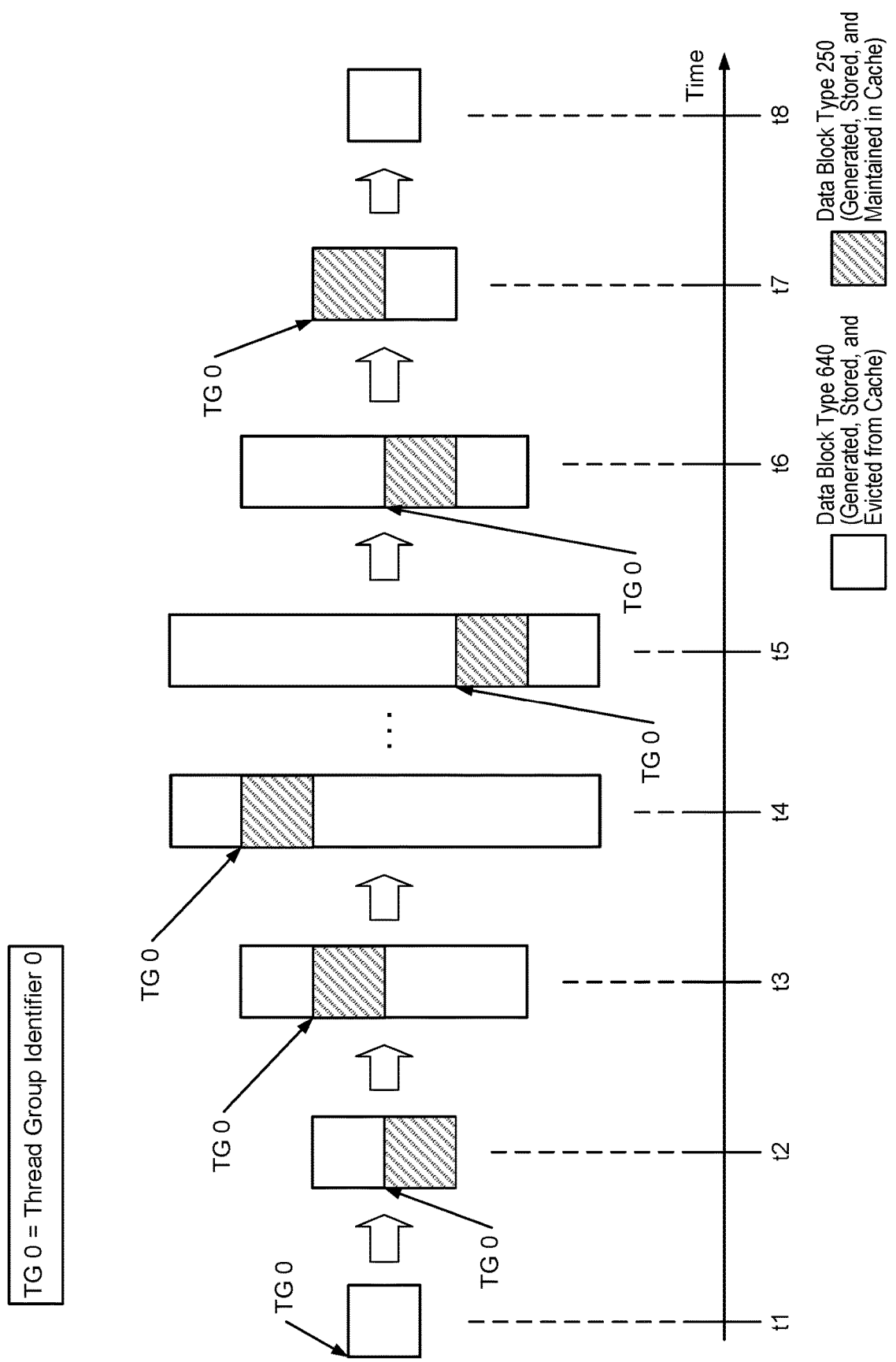
FIG. 7 is a generalized block diagram of a data storage arrangement of data blocks being processed in a manner to efficiently process memory requests.

Turning now to FIG. 7, a generalized block diagram is shown of processing data storage arrangements 700 used to efficiently process memory requests. Data types and identifiers described earlier are numbered identically. For example, the data block type 250 includes data blocks that have been generated, stored, and maintained in the cache such as the last-level cache. The processing data storage arrangements 700 (or storage arrangements 700) also includes multiple data blocks of the data block type 740. The data block type 740 includes data blocks that have been generated, stored, and evicted from the cache such as the last-level cache. As described earlier, in some implementations, the hardware of the cache controller of the cache supports a read-cache-data-and-evict-cache-data operation that places the cache line that has recently been read as the cache line to first evict for line replacement. The cache controller can also utilize a most-recently-used (MRU) cache replacement policy. Examples of the cache are the cache 120 (of FIG. 1) and the cache 690 (of FIG. 6). As shown, the amount of data generated over time increases and decreases. Although the data is shown to increase from point-in-time t1 (or time t1) to time t4, and decrease from time t5 to time t8, other patterns of data size changes between stages of data processing are possible and contemplated.

Each of the data shown at the different points in time include multiple data blocks of the data block type 740 and the data block type 250. At time t1, an initial amount of source data is received by the hardware of multiple compute circuits of a data processing circuit. The multiple compute circuits receive the source data with each data block assigned a corresponding thread group identifier, and the compute circuits generate the result data that includes multiple data blocks (and more data blocks) shown at time t2. In various implementations, the multiple compute circuits process data blocks in a contiguous manner, and a pointer updater circuit assigns thread group identifiers in a contiguous manner beginning with an initial block to be processed by the multiple compute circuits. The pointer updater circuit is aware of the number of data blocks to be generated by a particular convolution (particular stage of data processing). Therefore, the pointer updater circuit is able to update pointers (addresses of memory requests, thread group identifiers, and/or data block identifiers) in a manner as shown in the storage arrangements 200-500 (of FIGS. 2-5) in order to increase cache hits for a next immediate subsequent convolution (next immediate subsequent stage of data processing).

In an implementation, at time t2, the data being processed has a size of 96 data blocks, and at time t3, the data being processed has a size of 192 data blocks. The pointer updater circuit is aware each of these data sizes, and the number of data blocks that can be stored in the cache is 24 data blocks (or 2 rows). Since the number of data blocks of the data to be generated at time t3 is 192 data blocks (or 16 rows), the offset is 192 data blocks (or 16 rows) less 24 data blocks (or 2 rows), which provides an offset equal to 168 data blocks (or 14 rows forward wrapping around the range of data block identifiers, or 2 rows backward wrapping around the range of data block identifiers).

The current initial thread block group identifier is 0 at time t2, and the thread block identifier (or data block identifier) of the next initial thread group to execute is 168, which is based on the offset of 168 data blocks. Therefore, the pointer updater circuit is aware, prior to the next immediate subsequent stage of data processing, where the next initial data block will be located that will be later assigned the initial thread group identifier (thread group identifier 0). For example, the pointer updater circuit is aware of which row (and corresponding address) includes the next initial data block. The storage arrangements 700 shows the updating of the initial thread group identifier for times t1 to t8. The pointer updater circuit and the compute circuits are using the backward rolling offset technique to generate the storage arrangements 200-500 and 700 (of FIGS. 2-5 and 7), which increases cache hits during iterative stages of data processing.

Figure 8:
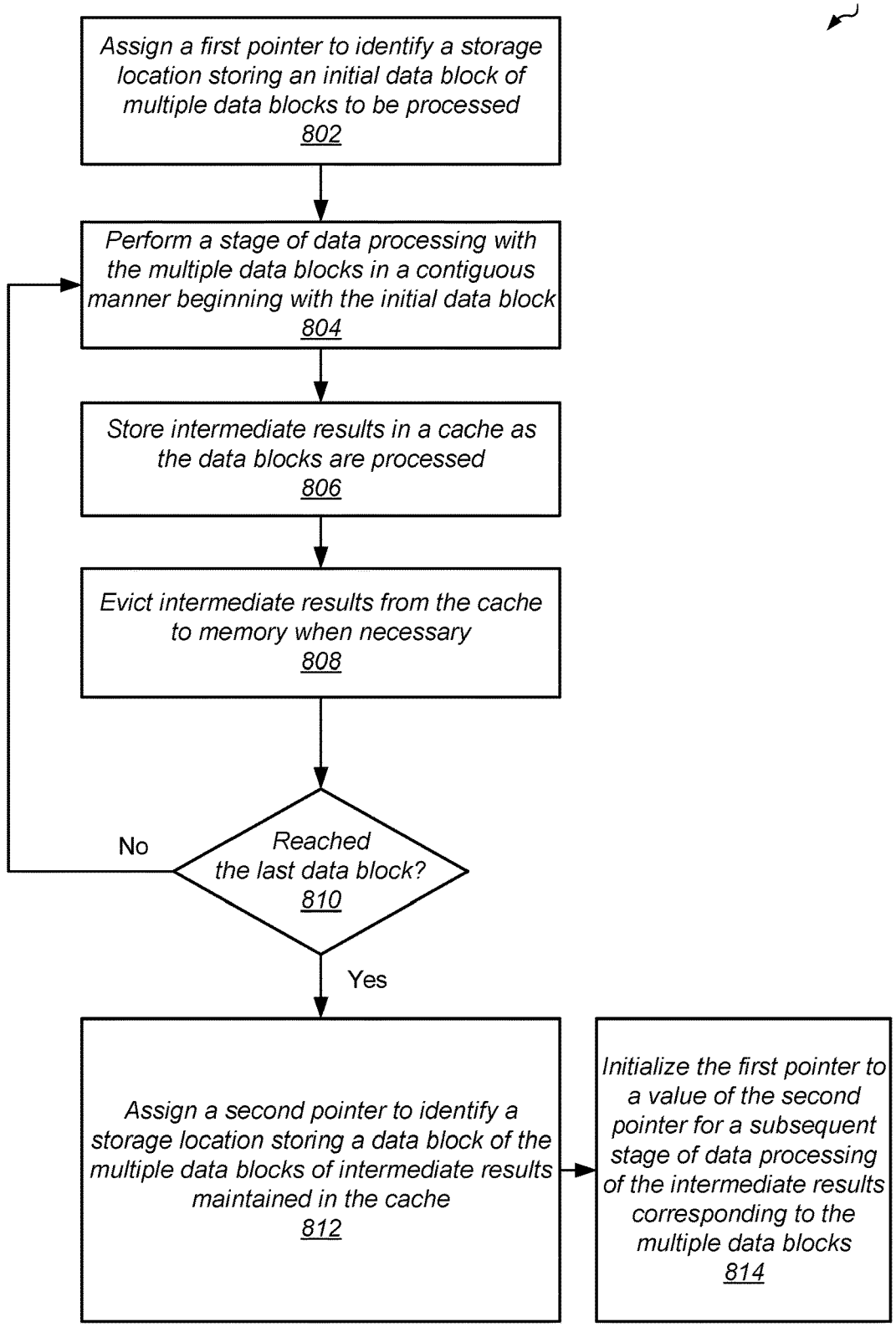
FIG. 8 is a generalized diagram of a method for efficiently processing memory requests.

Referring to FIG. 8, a generalized block diagram is shown of a method 800 for efficiently processing memory requests. For purposes of discussion, the steps in this implementation (as well as in FIGS. 9 and 15) are shown in sequential order. However, in other implementations some steps occur in a different order than shown, some steps are performed concurrently, some steps are combined with other steps, and some steps are absent.

For the methods 800, 900 and 1500 (of FIGS. 8, 9 and 15), in various implementations, a computing system includes a parallel data processing circuit, a cache, and a memory. The parallel data processing circuit includes multiple compute circuits, each capable of processing a data block of multiple data blocks. In an implementation, the cache represents a last level shared cache structure such as a level-three (L3) or other level. An amount of available data storage space of the cache is smaller than storage space in a memory for storing the multiple data blocks. In various implementations, the multiple compute circuits process data blocks in a contiguous manner, and a pointer updater circuit of the parallel data processing circuit assigns data block identifiers (thread group identifiers) in a contiguous manner. These data block identifiers (thread group identifiers) can be used as pointers. As described earlier, a "pointer" is a value that identifies a storage location in memory. A thread group identifier, a data block identifier, or another type of identifier used to indicate or specify a storage location in memory can be used to generate one or more of a physical address, a logical address or virtual address, and an offset of one of a physical address, and a logical address or a virtual address. The pointer updater circuit assigns a first pointer to identify a storage location storing an initial data block of multiple data blocks to be processed (block 802).

The compute circuits perform a stage of data processing with the multiple data blocks in a contiguous manner beginning with the initial data block (block 804). The compute circuits store intermediate results in a cache as the data blocks are processed (block 806). In some implementations, the compute circuits overwrite the original data blocks. In other implementations, the compute circuits write the intermediate results in new contiguous storage locations in the memory. The compute circuits evict intermediate results from the cache to the memory when necessary (block 808). In some implementations, the hardware of the cache controller of the cache supports a read-cache-data-and-evict-cache-data operation that places the cache line that has recently been read as the cache line to first evict for line replacement. The cache controller can also utilize a most-recently-used (MRU) cache replacement policy.

If the compute circuits have not yet reached the last data block ("no" branch of the conditional block 810), then control flow of method 800 returns to block 804 where the compute circuits perform a stage of data processing with the multiple data blocks in a contiguous manner beginning with the initial data block. If the compute circuits have reached the last data block ("yes" branch of the conditional block 810), then the pointer updater circuit assigns a second pointer to identify a storage location storing a data block of the multiple data blocks of intermediate results maintained in the cache (block 812). The pointer updater circuit initializes the first pointer to a value of the second pointer for a subsequent stage of data processing of the intermediate results corresponding to the multiple data blocks (block 814). In various implementations, the pointer updater circuit and the compute circuits are using the backward rolling offset technique to generate the storage arrangements 200-500 and 700 (of FIGS. 2-5 and 7), which increases cache hits during iterative stages of data processing.

Figure 9:
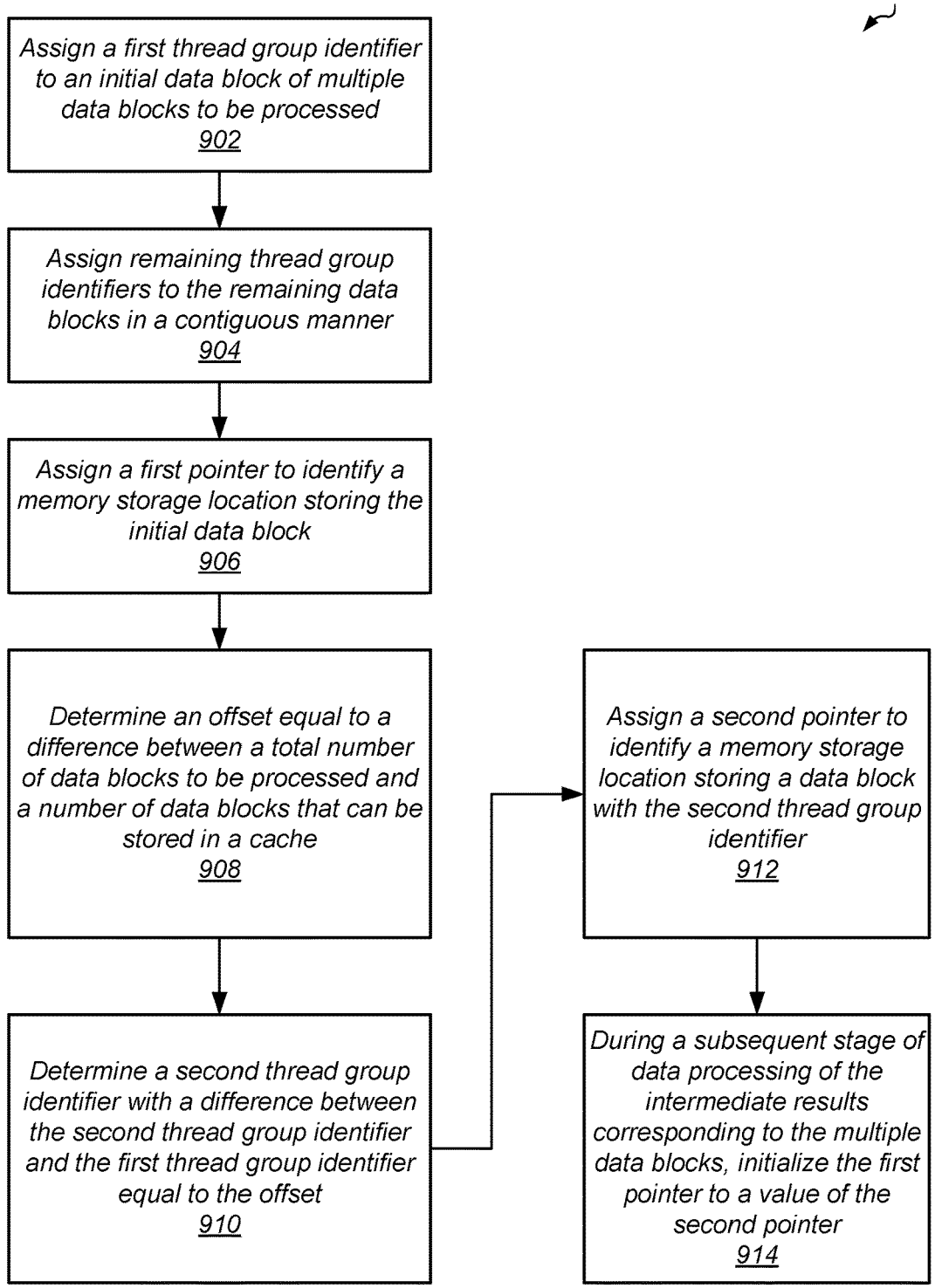
FIG. 9 is a generalized diagram of a method for efficiently processing memory requests.

Turning now to FIG. 9, a generalized block diagram is shown of a method 900 for efficiently processing memory requests. A pointer updater circuit of the parallel data processing circuit assigns a first thread group identifier to an initial data block of multiple data blocks to be processed (block 902). The pointer updater circuit assigns remaining thread group identifiers to the remaining data blocks in a contiguous manner (block 904). The pointer updater circuit assigns a first pointer to identify a memory storage location storing the initial data block (block 906). The pointer updater circuit determines an offset equal to a difference between a total number of data blocks to be processed and a number of data blocks that can be stored in a cache (block 908).

The pointer updater circuit determines a second thread group identifier with a difference between the second thread group identifier and the first thread group identifier equal to the offset (block 910). The pointer updater circuit assigns a second pointer to identify a memory storage location storing a data block with the second thread group identifier (block 912). During a subsequent stage of data processing of the intermediate results corresponding to the multiple data blocks, the pointer updater circuit initializes the first pointer to a value of the second pointer (block 914). By updating pointers in this manner, the pointer updater circuit accounts for data size changes during the stages of data processing as illustrated in the storage arrangement 700 (of FIG. 7).

Turning now to FIG. 10, a generalized block diagram is shown of processing data storage arrangement 1000 used to efficiently process memory requests. Similar to the storage arrangements 200-500 (of FIGS. 2-5), the processing data storage arrangement 1000 (or storage arrangement 1000) includes multiple data blocks stored in a contiguous order arranged as rows in a horizontal "X" direction and columns in a vertical "Y" direction. Data types and identifiers described earlier are numbered identically. The number of data blocks of the data to be generated is 96 data blocks (or 8 rows) and the number of data blocks that can be stored in the cache is 24 data blocks (or 2 rows). In other implementations, these data sizes have other values based on design requirements.

During an initial stage of data processing of multiple stages, the compute circuits of the parallel data processing circuit begin at the initial row of data to be processed (or initial row 212). The initial row 212 includes the initial data block 210, which is the data block of the initial row to be processed. After the in-order processing of the data blocks, the storage arrangement 200 includes data blocks of the data block type 240 in rows 0-5 and data blocks of the data block type 250 in rows 6-7. The initial row 222 includes the data block of the initial row that has data blocks of the data block type 250 (or the initial data block 220).

To increase the number of cache hits in the cache, such as the last-level cache, a pointer updater circuit of the parallel data processing circuit updates pointers (addresses of memory requests, thread group identifiers, and/or data block identifiers) that changes an order of data processing performed by the parallel data processing circuit. During the start of the subsequent second stage of data processing, the pointer updater circuit updates pointers that cause the compute circuits to generate memory requests targeting data stored in the initial row 222, rather than the initial row 212. A copy of this data of the rows 6-7 is currently stored in the cache at the start of the second stage of data processing. Therefore, the memory requests targeting this copy of the data result in cache hits. However, the pointer updater circuit causes the data block with thread group identifier 95 to be the initial data block to be processed in the immediate subsequent stage of data processing. In addition, the compute circuits process data blocks in a contiguous manner in a direction opposite of a direction used in an immediately previous stage of data processing. Therefore, during the next second stage of data processing, the compute circuits process data blocks in a contiguous manner in a direction opposite of a direction used in the first stage of data processing.

Referring to FIG. 11, a generalized block diagram is shown of processing data storage arrangement 1100 used to efficiently process memory requests. Data types and identifiers described earlier are numbered identically. The processing data storage arrangement 1100 (or storage arrangement 1100) includes multiple data blocks stored in a contiguous order after an initial stage of data processing has completed and prior to a subsequent second stage of data processing. To increase the number of cache hits in the cache, such as the last-level cache, a pointer updater circuit of the parallel data processing circuit updates pointers (addresses of memory requests, thread group identifiers, and/or data block identifiers) that change an order of data processing performed by the parallel data processing circuit. For example, after the initial stage of data processing has been completed, during the start of the subsequent second stage of data processing, the pointer updater circuit updates pointers that cause the compute circuits to generate memory requests targeting data stored in the initial row 1112 (row 7), rather than row 0. The initial row 1112 includes the data block of the initial row to be processed 1110 (or the initial data block 1110). A copy of this data of the rows 6-7 that include the data blocks 0-23 is currently stored in the cache at the start of the second stage of data processing.

In addition, during the next second stage of data processing, the compute circuits process data blocks in a contiguous manner in a direction opposite of a direction used in the first stage of data processing. The thread group identifiers 230 shown in the storage arrangement 1100 illustrate this direction of processing of thread group identifiers 0 (the initial thread group) to 95 (the final thread group). The pointer updater circuit provides the updated values of the thread group identifiers 230 in order to direct where to begin the next stage of data processing and to provide a direction for the data processing. During the next stage (second stage) of data processing, the compute circuits process data blocks in a contiguous manner in a direction opposite of a direction used in the previous stage (first stage) of data processing. The thread group identifiers 230 shown in the storage arrangement 1100 illustrate this direction of processing of thread group identifiers 0 (the initial thread group) to 95 (the final thread group).

Figure 12:
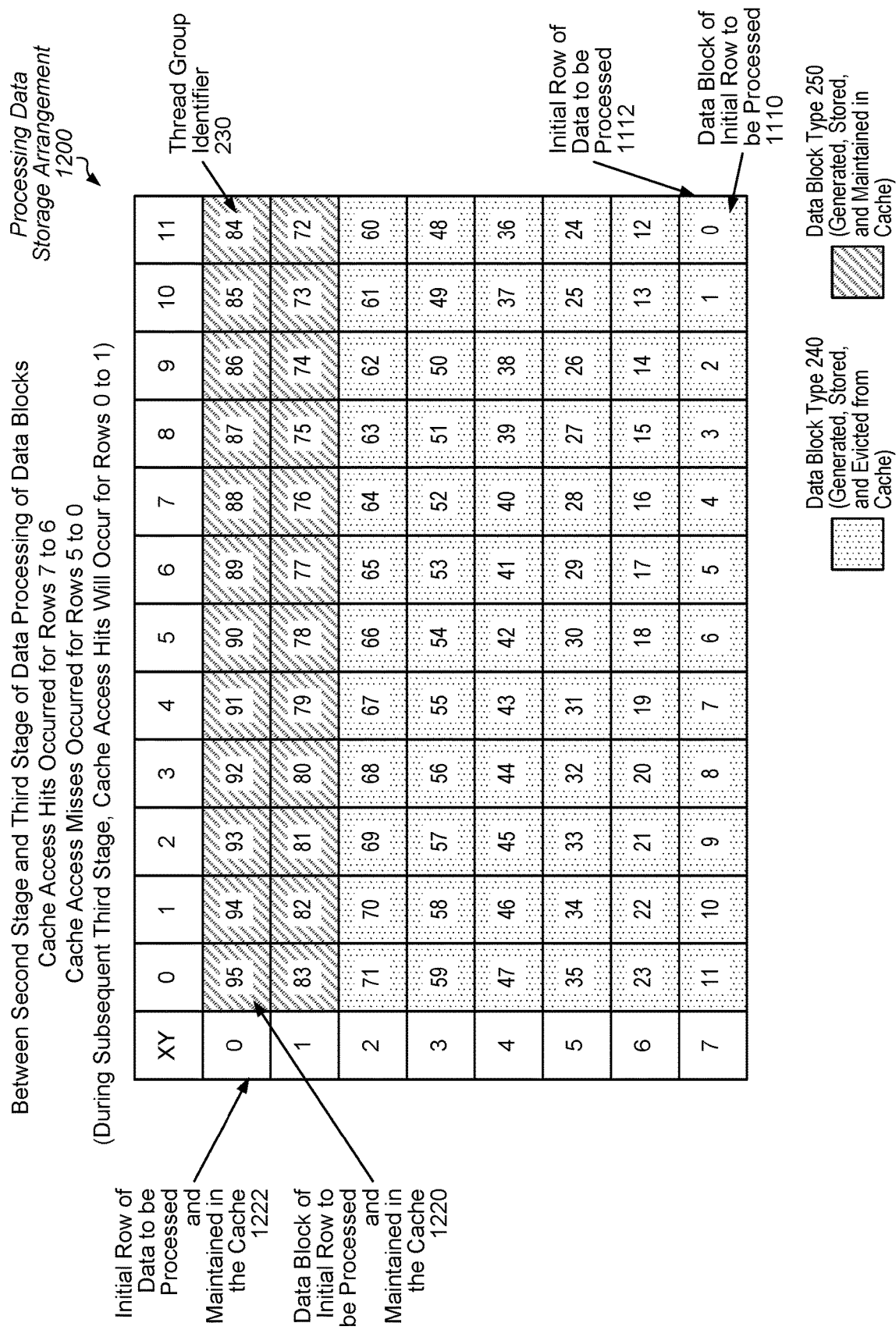
FIG. 12 is a generalized block diagram of a data storage arrangement of data blocks being processed in a manner to efficiently process memory requests.

Referring to FIG. 12, a generalized block diagram is shown of processing data storage arrangement 1200 used to efficiently process memory requests. Data types and identifiers described earlier are numbered identically. The processing data storage arrangement 1200 (or storage arrangement 1200) includes multiple data blocks stored in a contiguous order between a second stage of data processing and a subsequent third stage of data processing. To increase the number of cache hits in the cache, such as the last-level cache, the pointer updater circuit of the parallel data processing circuit updates pointers (addresses of memory requests, thread group identifiers, and/or data block identifiers) that changes an order of data processing performed by the parallel data processing circuit. For example, after the second stage of data processing has been completed, during the start of the subsequent third stage of data processing, the pointer updater circuit updates pointers that cause the compute circuits to generate memory requests targeting data stored in the initial row 1222 (row 0). The initial row 1222 includes the initial data block 1220, which is the data block of the initial row to be processed. A copy of this data of the rows 0-1 that include the data blocks 72-95 is currently stored in the cache at the start of the third stage of data processing. At the start of the third stage of data processing, the pointer updater circuit can rename the data block identifiers 230 (or thread group identifiers 230) from 95-72 in the rows 0-1 to identifiers 0-23 as further described in the upcoming description of the processing data storage arrangement 1300.

Referring to FIG. 13, a generalized block diagram is shown of processing data storage arrangement 1300 used to efficiently process memory requests. Data types and identifiers described earlier are numbered identically. The processing data storage arrangement 1300 (or storage arrangement 1300) includes multiple data blocks stored in a contiguous order between a second stage of data processing and a subsequent third stage of data processing. To increase the number of cache hits in the cache, such as the last-level cache, the pointer updater circuit of the parallel data processing circuit updates pointers (addresses of memory requests, thread group identifiers, and/or data block identifiers) to change an order of data processing performed by the parallel data processing circuit. For example, after the second stage of data processing has been completed, during the start of the subsequent third stage of data processing, the pointer updater circuit updates pointers that cause the compute circuits to generate memory requests targeting data stored in the initial row 1312 (row 0) to be processed during the third stage of data processing. The initial row 1312 includes the data block 1310, which is the data block of the first row to be processed 1310. A copy of this data of the rows 0-1 that include the data blocks 0-23 is currently stored in the cache at the start of the second stage of data processing.

During the next stage (third stage) of data processing, the compute circuits process data blocks in a contiguous manner in a direction opposite of a direction used in the previous stage (second stage) of data processing. The thread group identifiers 230 shown in the storage arrangement 1300 illustrate this direction of processing of thread group identifiers 0 (the initial thread group) to 95 (the final thread group). As used herein, the term "descending order technique" refers to a technique that when performed by the pointer updater circuit assigns, to a final data block of data blocks generated by the present stage of data processing, a thread group identifier (or data block identifier) that specifies which data block of the generated data blocks is an initial data block to be processed during a subsequent stage of data processing. The technique also includes the pointer updater circuit assigning thread group identifiers in a contiguous manner beginning with the initial data block and the compute circuits process data blocks in a contiguous manner. The pointer updater circuit and the compute circuits are using the descending order technique to generate the storage arrangements 1000-1300 (of FIGS. 10-13), which increases cache hits during iterative stages of data processing.

Figure 14:
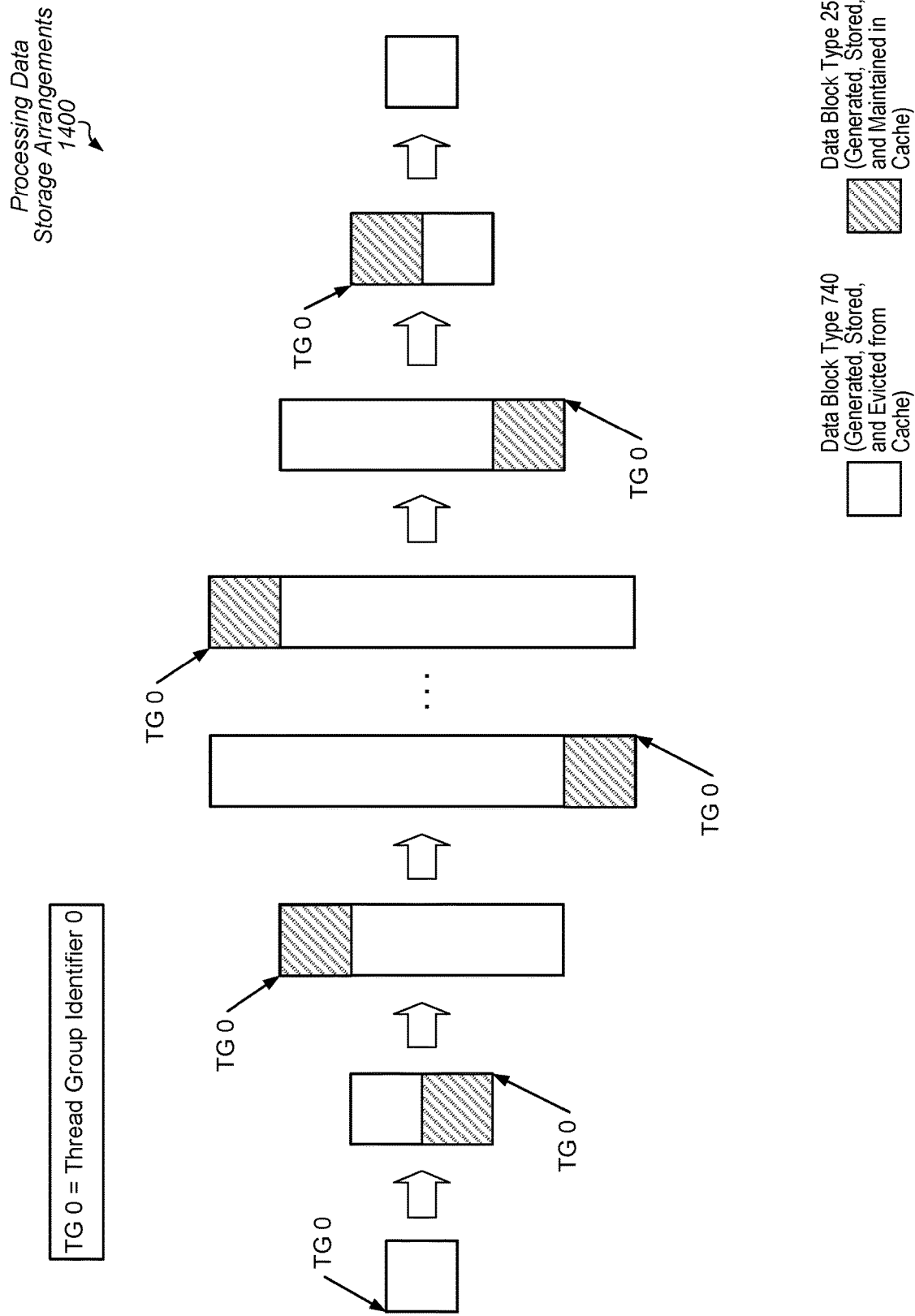
FIG. 14 is a generalized block diagram of a data storage arrangement of data blocks being processed in a manner to efficiently process memory requests.

Turning now to FIG. 14, a generalized block diagram is shown of processing data storage arrangements 1400 used to efficiently process memory requests. Data types and identifiers described earlier are numbered identically. Examples of the cache that stores data are the cache 120 (of FIG. 1) and the cache 690 (of FIG. 6). In an implementation, the cache represents a last level shared cache structure such as a level-three (L3) or other level. As shown, the amount of data generated over time increases and decreases. Although the data is shown to increase from point-in-time t1 (or time t1) to time t4, and decrease from time t5 to time t8, other patterns of data size changes between stages of data processing are possible and contemplated.

In various implementations, the multiple compute circuits process data blocks in a contiguous manner, and a pointer updater circuit assigns thread group identifiers in a contiguous manner beginning with an initial block to be processed by the multiple compute circuits. The pointer updater circuit is able to update pointers (addresses of memory requests, thread group identifiers, and/or data block identifiers) in a manner as shown in the storage arrangements 1000-1300 (of FIGS. 10-13) in order to increase cache hits for a next immediate subsequent convolution (next immediate subsequent stage of data processing). The pointer updater circuit and the compute circuits are using the descending order technique to generate the storage arrangements 1000-1400 (of FIGS. 10-14), which increases cache hits during iterative stages of data processing. Although the data sizes can change between back-to-back convolutions (back-to-back stages of data processing), the pointer updater circuit continues to update pointers regardless of the changed data size to cause the compute circuits to process data blocks in a contiguous manner in a direction opposite of a direction used in an immediate previous stage of data processing.

Figure 15:
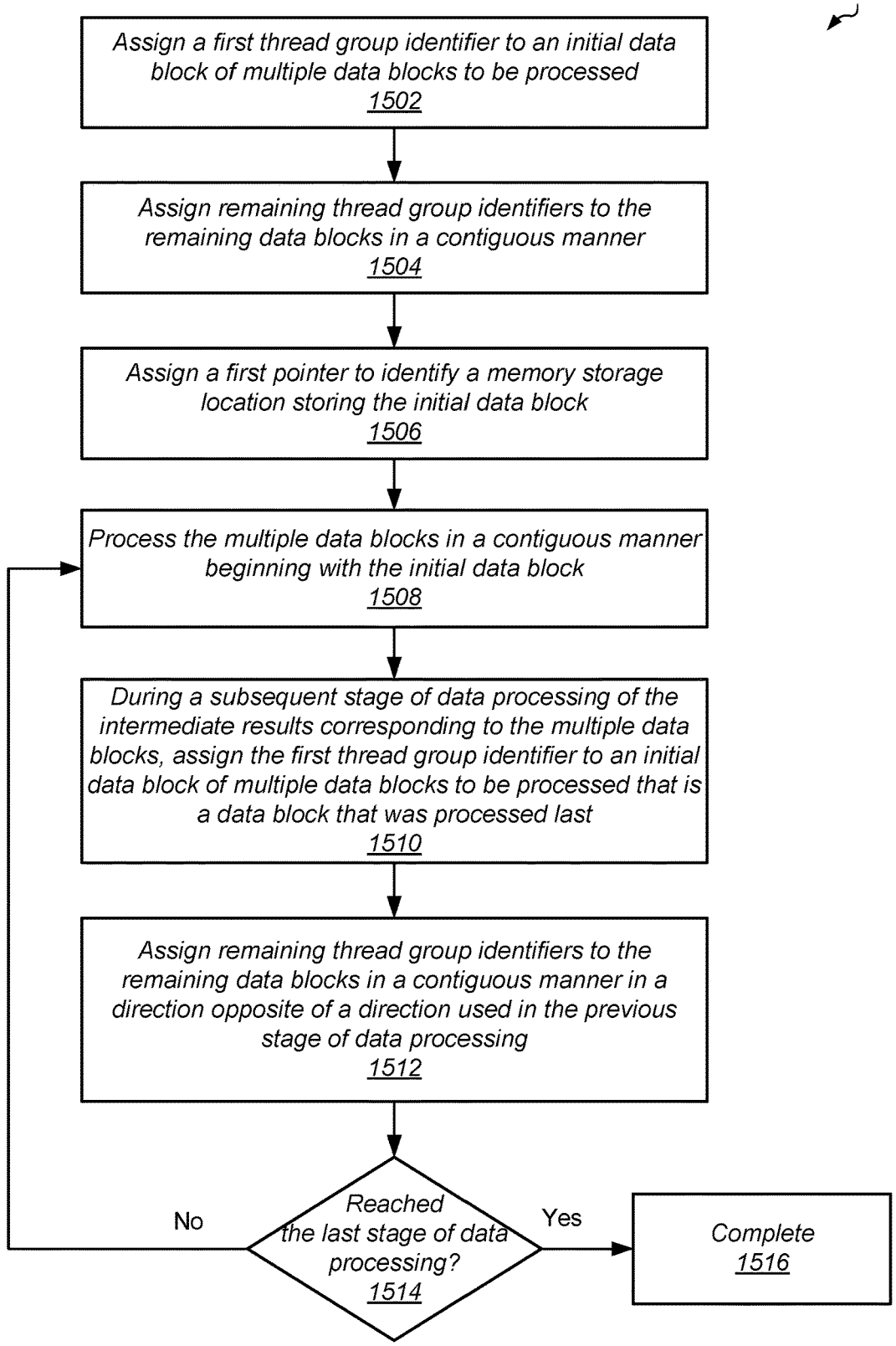
FIG. 15 is a generalized diagram of a method for efficiently processing memory requests.

Turning now to FIG. 15, a generalized block diagram is shown of a method 1500 for efficiently processing memory requests. A pointer updater circuit of the parallel data processing circuit assigns a first thread group identifier to an initial data block of multiple data blocks to be processed (block 1502). The pointer updater circuit assigns remaining thread group identifiers to the remaining data blocks in a contiguous manner (block 1504). The pointer updater circuit assigns a first pointer to identify a memory storage location storing the initial data block (block 1506).

The compute circuits of the parallel data processing circuit process the multiple data blocks in a contiguous manner beginning with the initial data block (block 1508). During a subsequent stage of data processing of the intermediate results corresponding to the multiple data blocks, the pointer updater circuit assigns the first thread group identifier to an initial data block of multiple data blocks to be processed that is a data block that was processed last (block 1510). The pointer updater circuit assigns remaining thread group identifiers to the remaining data blocks in a contiguous manner in a direction opposite of a direction used in the previous stage of data processing (block 1512). In various implementations, the pointer updater circuit and the compute circuits are using the descending order technique to generate the storage arrangements 1000-1400 (of FIGS. 10-14), which increases cache hits during iterative stages of data processing.

If the compute circuits have not yet reached the last stage of data processing ("no" branch of the conditional block 1514), then control flow of method 1500 returns to block 1508 where the compute circuits process the multiple data blocks in a contiguous manner beginning with the initial data block. If the compute circuits have reached the last stage of data processing ("yes" branch of the conditional block 1514), then the data processing has completed (block 1516).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVER, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
   one or more compute circuits configured to process a plurality of data blocks in at least a first processing stage and a second processing stage; and
   an updater circuit configured to generate a first identifier to identify a storage location storing an initial data block of a first plurality of data blocks;
   wherein during the first processing stage, the one or more compute circuits are configured to:
   generate intermediate data; and
   store the intermediate data in a cache, wherein at least a portion of the intermediate data is evicted from the cache during the first processing stage responsive to the cache not having enough available space to store all of the intermediate data;
   wherein responsive to detection of an end of the first processing stage, the updater circuit is configured to update the first identifier to cause the one or more compute circuits to begin the second processing stage with portions of the intermediate data in the cache that were not evicted during the first processing stage.

2. The integrated circuit as recited in claim 1, wherein the updater circuit is configured to update the first identifier to cause the one or more compute circuits to generate memory requests to target portions of the intermediate data in the cache at the end of the first processing stage prior to targeting intermediate data evicted during the first processing stage.

3. The integrated circuit as recited in claim 2, wherein to update the first identifier, the updater circuit is further configured to;
   generate a second identifier to identify a storage location storing a first data block of the intermediate data in the cache instead of a second data block of the intermediate data generated based on the initial data block of the first plurality of data blocks; and
   update the first identifier to a value of the second identifier to cause the one or more compute circuits to execute the second processing stage using the second data block after accessing each of the first plurality of data blocks during the first processing stage.

4. The integrated circuit as recited in claim 3, wherein to generate the second identifier, the updater circuit is further configured to;
   generate an offset equal to a difference between a total number of data blocks of the intermediate data and a number of data blocks of the first plurality of data blocks that can be stored in the cache;
   generate a first data block identifier having a difference equal to the offset between the first data block identifier and a second data block identifier of the initial data block of the first plurality of data blocks; and
   generate the second identifier to identify a memory storage location storing a data block with the first data block identifier.

5. The integrated circuit as recited in claim 3, wherein the one or more compute circuits are configured to iteratively execute a plurality of processing stages, each beginning with a data block based stored in the cache instead of a data block generated using an initial data block of a previous stage of the plurality of processing stages.

6. The integrated circuit as recited in claim 2, wherein the updater circuit is further configured to assign, to a final data block of the intermediate data, a data block identifier that specifies the final data block as an initial data block to be processed by the one or more compute circuits during a subsequent processing stage.

7. The integrated circuit as recited in claim 6, wherein the updater circuit is further configured to assign data block identifiers to remaining unassigned data blocks of the intermediate data, in a contiguous manner in a direction opposite of a direction of processing by the one or more compute circuits of data blocks used in the first processing stage.

8. A method comprising:
processing, by one or more compute circuits, a plurality of data blocks in at least a first processing stage and a second processing stage;
generating, by an updater circuit, a first identifier to identify a storage location storing an initial data block of a first plurality of data blocks;
generating intermediate data by the one or more compute circuits during the first processing stage;
storing the intermediate data in a cache by the one or more compute circuits during the first processing stage, wherein at least a portion of the intermediate data is evicted from the cache during the first processing stage responsive to the cache not having enough available space to store all of the intermediate data;
responsive to detection of an end of the first processing stage, updating, by the updated circuit, the first identifier to cause the one or more compute circuits to begin the second processing stage with portions of the intermediate data in the cache that were not evicted during the first processing stage.

9. The method as recited in claim 8, further comprising updating, by the updater circuit, the first identifier to cause the one or more compute circuits to generate memory requests to target portions of the intermediate data in the cache at the end of the first processing stage prior to targeting intermediate data evicted during the first processing stage.

10. The method as recited in claim 8, further comprising:
generating, by the updater circuit, a second identifier to identify a storage location storing a first data block of the intermediate data in the cache instead of a second data block of the intermediate data generated based on the initial data block of the first plurality of data blocks; and
updating, by the updated circuit, the first identifier to a value of the second identifier to cause the one or more compute circuits to execute the second processing stage using the second data block after accessing each of the first plurality of data blocks during the first processing stage.

11. The method as recited in claim 10, further comprising wherein to generate the second identifier, the method further comprises:
generating, by the updater circuit, an offset equal to a difference between a total number of data blocks of the intermediate data and a number of data blocks of the first plurality of data blocks that can be stored in the cache;
generating, by the updater circuit, a first data block identifier having a difference equal to the offset between the first data block identifier and a second data block identifier of the initial data block of the first plurality of data blocks; and
generating, by the updater circuit, the second identifier to identify a memory storage location storing a data block with the first data block identifier.

12. The method as recited in claim 11, further comprising iteratively executing, by the one or more compute circuits, a plurality of processing stages, each beginning with a data block based stored in the cache instead of a data block generated using an initial data block of a previous stage of the plurality of processing stages.

13. The method as recited in claim 11, further comprising assigning, by the updater circuit to a final data block of the intermediate data, a data block identifier that specifies the final data block as an initial data block to be processed by the one or more compute circuits during a subsequent processing stage.

14. The method as recited in claim 13, further comprising assigning, by the updater circuit, data block identifiers to remaining unassigned data blocks of the intermediate data, in a contiguous manner in a direction opposite of a direction of processing by the one or more compute circuits of data blocks used in the first processing stage.

15. A computing system comprising:
a cache configured to store a copy of data stored in a memory;
a processing circuit comprising:
one or more compute circuits configured to process a plurality of data blocks in at least a first processing stage and a second processing stage; and
an updater circuit configured to generate a first identifier to identify a storage location storing an initial data block of a first plurality of data blocks;
wherein during the first processing stage, the one or more compute circuits are configured to:
generate intermediate data; and
store the intermediate data in the cache, wherein at least a portion of the intermediate data is evicted from the cache during the first processing stage responsive to the cache not having enough available space to store all of the intermediate data;
wherein responsive to detection of an end of the first processing stage, the updater circuit is configured to update the first identifier to cause the one or more compute circuits to begin the second processing stage with portions of the intermediate data in the cache that were not evicted during the first processing stage.

16. The computing system as recited in claim 15, wherein the updater circuit is configured to update the first identifier to cause the one or more compute circuits to generate memory requests to target portions of the intermediate data in the cache at the end of the first processing stage prior to targeting intermediate data evicted during the first processing stage.

17. The computing system as recited in claim 16, wherein the updater circuit is further configured to assign, to a final data block of the intermediate data, a data block identifier that specifies the final data block as an initial data block to be processed by the one or more compute circuits during a subsequent processing stage.

18. The computing system as recited in claim 15, wherein to update the first identifier, the updater circuit is further configured to;
generate a second identifier to identify a storage location storing a first data block of the intermediate data in the cache instead of a second data block of the intermediate data generated based on the initial data block of the first plurality of data blocks; and
update the first identifier to a value of the second identifier to cause the one or more compute circuits to execute the second processing stage using the second data block after accessing each of the first plurality of data blocks during the first processing stage.

19. The computing system as recited in claim 18, wherein to generate the second identifier, the updater circuit is further configured to;
   generate an offset equal to a difference between a total number of data blocks of the intermediate data and a number of data blocks of the first plurality of data blocks that can be stored in the cache;
   generate a first data block identifier having a difference equal to the offset between the first data block identifier and a second data block identifier of the initial data block of the first plurality of data blocks; and
   generate the second identifier to identify a memory storage location storing a data block with the first data block identifier.

20. The computing system as recited in claim 19, wherein the one or more compute circuits are configured to iteratively execute a plurality of processing stages, each beginning with a data block based stored in the cache instead of a data block generated using an initial data block of a previous stage of the plurality of processing stages.

\* \* \* \* \*